US012650762B2

(12) United States Patent
Vigon et al.

(10) Patent No.: US 12,650,762 B2
(45) Date of Patent: Jun. 9, 2026

(54) TOUCH ENABLED GRAPHICAL USER INTERFACES AND SYSTEMS FOR DISTRIBUTING REAL TIME CONTENT

(71) Applicant: Vigon AI Media Inc., Manhattan Beach, CA (US)

(72) Inventors: Carlos Paxton Vigon, Manhattan Beach, CA (US); Antonio Zane Vigon, Manhattan Beach, CA (US); Carlos A.G. Vigon, Manhattan Beach, CA (US); Susan Shelton Vigon, Manhattan Beach, CA (US)

(73) Assignee: Vigon AI Media Inc., Manhattan Beach, CA (US)

( * ) Notice: Subject to any disclaimer, the term of this patent is extended or adjusted under 35 U.S.C. 154(b) by 0 days.

(21) Appl. No.: 19/372,094

(22) Filed: Oct. 28, 2025

(65) Prior Publication Data

US 2026/0133676 A1     May 14, 2026

Related U.S. Application Data

(60) Provisional application No. 63/720,040, filed on Nov. 13, 2024.

(51) Int. Cl.
*G06F 3/0484* (2022.01)
*G06F 3/01* (2006.01)
(Continued)

(52) U.S. Cl.
CPC ............ *G06F 3/0484* (2013.01); *G06F 3/017* (2013.01); *G06F 3/0488* (2013.01); *G06F 3/04883* (2013.01); *G06F 16/24578* (2019.01);

*G06F 16/248* (2019.01); *G06F 16/9535* (2019.01); *G06F 16/9537* (2019.01); *G06F 21/31* (2013.01); *G06F 21/64* (2013.01); *G06Q 30/0282* (2013.01); *G06V 10/70* (2022.01); *G06V 20/40* (2022.01); *H04L 9/50* (2022.05); *H04L 63/08* (2013.01); *H04N 5/77* (2013.01)

(58) Field of Classification Search
CPC .... G06F 3/017; G06F 3/0488; G06F 3/04883; G06F 16/9535; G06F 16/9537; G06Q 30/0282; G06V 10/70; H04L 9/50
See application file for complete search history.

(56) References Cited

U.S. PATENT DOCUMENTS

| | | | |
|---|---|---|---|
| 8,090,714 B2 * | 1/2012 | Yang | G06F 16/9537 707/724 |
| 8,527,307 B2 * | 9/2013 | Hamilton, II | G06Q 30/0282 705/7.42 |

(Continued)

FOREIGN PATENT DOCUMENTS

| | | | | |
|---|---|---|---|---|
| KR | 102384763 B1 * | 4/2022 | | H04W 4/02 |
| KR | 2025171961 A * | 5/2024 | | |

*Primary Examiner* — Benjamin Smith
(74) *Attorney, Agent, or Firm* — Knobbe, Martens, Olson & Bear LLP

(57)     ABSTRACT

Methods and systems are described for enhanced, touch enabled graphical user interfaces optimized for mobile devices. The mobile device may comprise a display with a capacitive array. An application specific application circuit may comprise Processing Elements (PEs), which are configured to perform operations comprising matrix multiplications, convolutions, and activation functions. The PEs may be organized in a grid or array format.

20 Claims, 13 Drawing Sheets

(51) Int. Cl.

| | |
|---|---|
| *G06F 3/0488* | (2022.01) |
| *G06F 3/04883* | (2022.01) |
| *G06F 16/2457* | (2019.01) |
| *G06F 16/248* | (2019.01) |
| *G06F 16/9535* | (2019.01) |
| *G06F 16/9537* | (2019.01) |
| *G06F 21/31* | (2013.01) |
| *G06F 21/64* | (2013.01) |
| *G06Q 30/0282* | (2023.01) |
| *G06V 10/70* | (2022.01) |
| *G06V 20/40* | (2022.01) |
| *H04L 9/00* | (2022.01) |
| *H04L 9/40* | (2022.01) |
| *H04N 5/77* | (2006.01) |

(56) References Cited

U.S. PATENT DOCUMENTS

| | | | | |
|---|---|---|---|---|
| 8,548,974 | B2 * | 10/2013 | Tewalt | G06F 16/9535 |
| | | | | 707/707 |
| 8,930,837 | B2 * | 1/2015 | Walkin | G06T 11/00 |
| | | | | 715/764 |
| 9,076,165 | B2 * | 7/2015 | Busch | G06Q 30/0205 |
| 9,250,092 | B2 * | 2/2016 | Blumenberg | G08G 1/096866 |
| 9,824,323 | B1 * | 11/2017 | Weiss | H04W 4/029 |
| 10,277,581 | B2 * | 4/2019 | Chandrasekharan | G10L 17/06 |
| 10,521,623 | B2 * | 12/2019 | Rodriguez | G06K 7/10297 |
| 10,565,279 | B2 * | 2/2020 | Reddy | G06F 16/9537 |
| 10,855,676 | B2 * | 12/2020 | Chandrasekharan | |
| | | | | H04L 9/3226 |
| 10,891,049 | B1 * | 1/2021 | Singh | G06F 3/04847 |
| 10,904,346 | B2 * | 1/2021 | Fu | G06F 16/9535 |
| 10,963,529 | B1 * | 3/2021 | Amitay | G06F 3/04817 |
| 11,232,386 | B1 * | 1/2022 | Weiss | H04W 4/02 |
| 11,474,663 | B2 * | 10/2022 | Amitay | G06F 3/04817 |
| 11,636,527 | B2 * | 4/2023 | Shahul Hamid | G06Q 30/0631 |
| | | | | 705/26.7 |
| 12,236,441 | B2 * | 2/2025 | Chen | G06F 16/2228 |
| 12,401,826 | B2 * | 8/2025 | Liu | G06V 20/41 |
| 12,511,094 | B2 * | 12/2025 | Frieder | G06F 3/147 |
| 12,517,943 | B2 * | 1/2026 | Frieder | G06F 16/435 |
| 12,517,965 | B2 * | 1/2026 | Noskov | G06F 16/9536 |
| 2007/0011150 | A1 * | 1/2007 | Frank | G06F 16/9537 |
| 2007/0022097 | A1 * | 1/2007 | Twalt | G06F 16/9535 |
| 2008/0270366 | A1 * | 10/2008 | Frank | G06F 16/29 |
| 2009/0112683 | A1 * | 4/2009 | Hamilton, II | G06Q 30/0282 |
| | | | | 705/7.32 |
| 2009/0281724 | A1 * | 11/2009 | Blumenberg | G01C 21/3667 |
| | | | | 701/532 |
| 2011/0137730 | A1 * | 6/2011 | McCarney | H04M 3/42289 |
| | | | | 705/14.58 |

| | | | | |
|---|---|---|---|---|
| 2012/0166432 | A1 * | 6/2012 | Tseng | G06Q 50/01 |
| | | | | 707/E17.084 |
| 2012/0304087 | A1 * | 11/2012 | Walkin | H04W 4/02 |
| | | | | 715/764 |
| 2012/0324228 | A1 | 12/2012 | Padhye et al. | |
| 2013/0013595 | A1 * | 1/2013 | Tseng | G06Q 50/01 |
| | | | | 707/723 |
| 2014/0256360 | A1 * | 9/2014 | Busch | G06Q 20/322 |
| | | | | 455/456.3 |
| 2015/0356644 | A1 * | 12/2015 | Diana | H04W 4/029 |
| | | | | 705/347 |
| 2016/0048906 | A1 * | 2/2016 | Eraker | G06Q 30/0641 |
| | | | | 705/27.1 |
| 2016/0132220 | A1 * | 5/2016 | Chiu | G06F 3/04847 |
| | | | | 715/772 |
| 2016/0140672 | A1 * | 5/2016 | Shnitzer | G06F 3/0482 |
| | | | | 715/753 |
| 2016/0337373 | A1 | 11/2016 | Tseng et al. | |
| 2016/0379202 | A1 * | 12/2016 | Turner | G06Q 20/321 |
| | | | | 705/39 |
| 2017/0068805 | A1 * | 3/2017 | Chandrasekharan | |
| | | | | G10L 21/003 |
| 2017/0277702 | A1 * | 9/2017 | Grimsmo | G06F 16/2425 |
| 2017/0374504 | A1 | 12/2017 | Synal | |
| 2018/0095977 | A1 * | 4/2018 | Reddy | G06F 16/24575 |
| 2018/0173906 | A1 * | 6/2018 | Rodriguez | G06Q 50/265 |
| 2018/0210886 | A1 | 7/2018 | Garg et al. | |
| 2018/0332041 | A1 | 11/2018 | Fan et al. | |
| 2019/0260731 | A1 * | 8/2019 | Chandrasekharan | G06F 3/165 |
| 2020/0051137 | A1 * | 2/2020 | Williams | H04L 63/0838 |
| 2020/0107165 | A1 | 4/2020 | Pai et al. | |
| 2020/0177688 | A1 * | 6/2020 | Fu | G06F 16/535 |
| 2020/0380593 | A1 * | 12/2020 | Block | G06F 3/04883 |
| 2020/0401305 | A1 * | 12/2020 | Singh | G06F 3/04847 |
| 2021/0027340 | A1 * | 1/2021 | Turner | G06Q 30/0282 |
| 2021/0029137 | A1 * | 1/2021 | Wright | H04L 63/08 |
| 2021/0089548 | A1 | 3/2021 | Lim et al. | |
| 2021/0357104 | A1 * | 11/2021 | Amitay | G06F 3/04817 |
| 2021/0374835 | A1 * | 12/2021 | Waldron | H04L 67/63 |
| 2022/0076316 | A1 * | 3/2022 | Shahul Hamid | G06Q 30/0631 |
| 2022/0191219 | A1 * | 6/2022 | Wright | H04L 63/08 |
| 2023/0030245 | A1 * | 2/2023 | Beaurepaire | G06F 16/9538 |
| 2023/0252494 | A1 * | 8/2023 | Chen | G06F 16/2228 |
| | | | | 705/7.29 |
| 2023/0259919 | A1 * | 8/2023 | Dorward | G06Q 20/389 |
| | | | | 705/66 |
| 2023/0334536 | A1 * | 10/2023 | Brooks | H04W 4/021 |
| 2023/0385662 | A1 | 11/2023 | Petersen | |
| 2024/0048773 | A1 * | 2/2024 | Liu | H04N 19/17 |
| 2024/0232959 | A1 * | 7/2024 | Vesentini | G06Q 20/401 |
| 2024/0256619 | A1 * | 8/2024 | Noskov | G06F 16/9024 |
| 2025/0053628 | A1 * | 2/2025 | Tali | H04L 9/50 |
| 2025/0385807 | A1 * | 12/2025 | Finlow-Bates | H04L 9/50 |

* cited by examiner

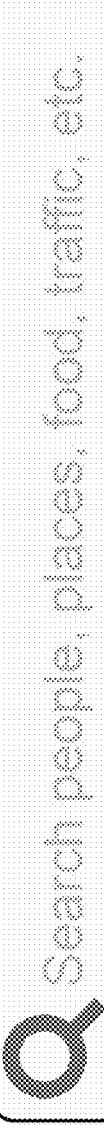
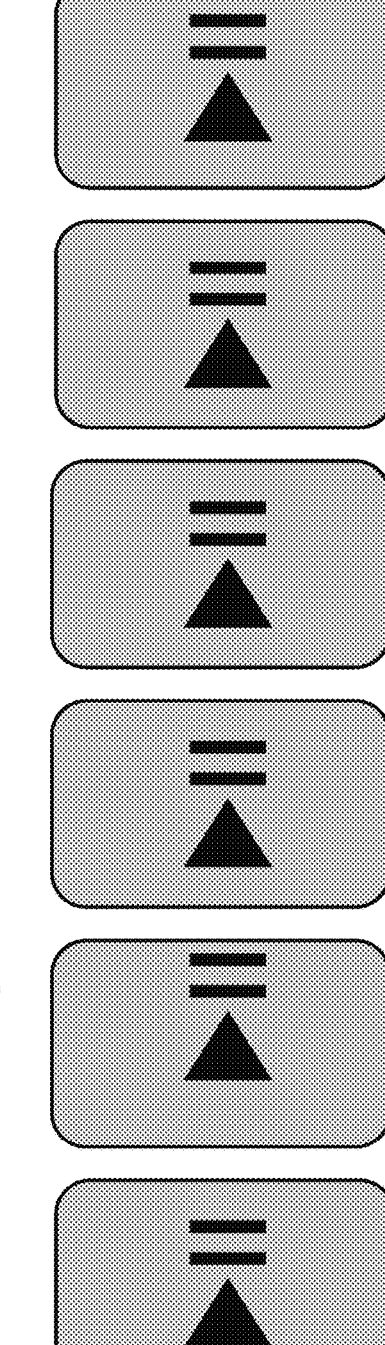
FIG. 4D1

FIG. 4D2

TOUCH ENABLED GRAPHICAL USER INTERFACES AND SYSTEMS FOR DISTRIBUTING REAL TIME CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to providing improved graphical user interfaces (GUIs) on computing devices, such as mobile computing devices and other user computing devices, including computer devices with touch-sensitive displays.

Description of the Related Art

User devices, such as smartphones, are increasingly used to create and provide content, such as video content, as well as to receive and display content, such as streaming video content. Such user devices may provide graphical user interfaces (GUIs) configured to be used in creating, transmitting, receiving, and displaying content.

Disadvantageously, such graphical user interfaces are often cumbersome to use, requiring navigation amongst many user interfaces and controls. Furthermore, such graphical user interfaces may not be sufficiently optimized for user devices having relatively small, touch sensitive displays. These deficiencies may impede the creation and submission of content, particularly when such content is to be created and submitted substantially immediately after an event that is to be the subject of such content.

Further, applications may be utilized by illegitimate actors that utilize automated programs (bots) to access networked services. Such use of robots can unduly utilize network and computer resources and may submit illegitimate, fake, data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a computer-implemented method, the method comprising: in response to a first event, displaying on a user device a touch-enabled user interface configured to respond to finger swipes, wherein in response to a user finger swipe in a first direction a first user interface is displayed, the first user interface configured to receive positive feedback regarding an item, and in response to a user finger swipe in a second direction, the second direction opposite of the first direction, a second user interface is displayed, the second user interface configured to receive negative feedback regarding the item; at least partly in response to detecting a swipe in the first direction, causing the first user interface to be presented comprising a video viewfinder displaying an image from a camera of the user device in association with a record control; at least partly in response to detecting activation of the record control, recording video content using the camera of the user device; transmitting the video content over a wireless network to a cloud storage system; and posting the video content and enabling a plurality of devices of other users to access the video content.

Optionally, the method further comprises: using a first learning engine to detect objects in the video content; accessing profile information for the user; providing an identification of one or more detected objects to a second learning engine; providing user profile information to the second learning engine; using the second learning engine to select a set of video content; and transmitting video content from the set of the video content to the user device. Optionally, the method further comprises: determining a descriptive term for the video content; and generating a unique uniform resource locator for the video content including a second level domain comprising the descriptive term. Optionally, the method further comprises: recording the video content or a link thereto on a blockchain; enabling an authenticity of the video content to be verified by recomputing the hash of the video content and comparing the recomputed hash with a hash of the video content stored on the blockchain; and enabling a transferable non-fungible token corresponding to the video content to be minted. Optionally, the method further comprises: using an artificial intelligence engine to identify similarities between the user and a second user; based at least in part on the identified similarities, pairing the user with the second user; and at least partly in response to pairing the user with the second user, enabling the user and the second user to electronically communicate. Optionally, the method further comprises: causing a search user interface to be displayed on the user device; receiving a user search query; identifying content based at least in part on the user's search query and a determined user location; ranking the identified content; and transmitting at least a portion of the ranked content to the user device in ranked order. Optionally, the method further comprises: transmitting the video content and/or a link thereto to a first destination; and enabling the first destination to electronically communicate with the user in substantially real time. Optionally, the method further comprises: detecting that a second user attempting to create a user account is an automated robot; and at least partly in response to detecting that the second user attempting to create a user account is an automated robot, blocking a first network communication from the second user. Optionally, the method further comprises: providing a user interface via which the user is enabled to provide one or more tags; receiving one or more tags from the user via the user interface via which the user is enabled to provide one or more tags; storing the tags in association with the video content; and enabling a search engine to utilize the tags in performing a search. Optionally, wherein the first user interface indicates that it is configured to receive positive feedback, and the second user interface indicates that it is configured to receive negative feedback. Optionally, the method further comprises updating a profile of the user based at least in part on an analysis of the video content and/or tags associated therewith. Optionally, the method further comprises enabling a map user interface to be displayed on the user device in response to a first event, the map comprising an image of a venue, a name of the venue, data on feedback from users regarding the venue, and a map indicating a location of the venue.

An aspect to the present disclosure relates to a system, the system comprising: a first computing device; a circuit comprising a plurality of core processors arranged in a grid and configured to perform operations in parallel; and non-transitory computer readable memory that stores instructions that when executed by the computing device cause the system to perform operations comprising: in response to a first event, cause a touch-enabled user interface configured to respond to finger swipes to be displayed on a user device, wherein in response to a user finger swipe in a first direction a first user interface is displayed, the first user interface configured to receive positive feedback regarding an item, and in response to a user finger swipe in a second direction, the second direction opposite of the first direction, a second user interface is displayed, the second user interface configured to receive negative feedback regarding the item; at least partly in response to detecting a swipe in the first direction, enable the first user interface to be presented comprising a video viewfinder displaying an image from a camera of the user device in association with a record control; at least partly in response to detecting activation of the record control, recording video content using the camera of the user device; use the circuit to identify objects in the video content and to associate tags with the video content; use the tags to select content to provide to the user; transmit the video content over a wireless network to a storage system; and post the video content and enabling a plurality of devices of other users to access the video content.

Optionally, using the tags to select content to provide to the user further comprises: access profile information for the user; provide of one or more of the tags to a learning engine; provide user profile information to the learning engine; use the learning engine to select a set of video content; and transmit video content from the set of the video content to the user device. Optionally, the operations further comprise: determine a descriptive term for the video content; and generate a unique uniform resource locator for the video content including a second level domain comprising the descriptive term. Optionally, the operations further comprise: record the video content or a link thereto on a blockchain; enable an authenticity of the video content to be verified by recomputing the hash of the video content and comparing the recomputed hash with a hash of the video content stored on the blockchain; and enable a transferable non-fungible token corresponding to the video content to be minted. Optionally, the operations further comprise: use an artificial intelligence engine to identify similarities between the user and a second user; based at least in part on the identified similarities, associate the user with the second user; and at least partly in response to associating the user with the second user, enable the user and the second user to electronically communicate. Optionally, the operations further comprise: cause a search user interface to be displayed on the user device; receive a user search query; identify content based at least in part on the user's search query and a determined user location; rank the identified content; and transmit at least a portion of the ranked content to the user device in ranked order. Optionally, the operations further comprise: transmit the video content and/or a link thereto to a first destination; and enable the first destination to electronically communicate with the user in substantially real time. Optionally, the operations further comprise: detect that a second user attempting to create a user account is an automated robot; and at least partly in response to detecting that the second user attempting to create a user account is an automated robot, block a first network communication from the second user. Optionally, the operations further comprise: provide a user interface via which the user is enabled to provide one or more tags; receive one or more tags from the user via the user interface via which the user is enabled to provide one or more tags; store the tags in association with the video content; and enable a search engine to utilize the tags in performing a search. Optionally the first user interface indicates that it is configured to receive positive feedback, and the second user interface indicates that it is configured to receive negative feedback. Optionally, the operations further comprise: updating a profile of the user based at least in part on an analysis of the video content and/or tags associated therewith. Optionally, the operations further comprise: enable a map user interface to be displayed on the user device in response to a first event, the map comprising an image of a venue, a name of the venue, data on feedback from users regarding the venue, and a map indicating a location of the venue.

BRIEF DESCRIPTION OF THE DRAWINGS

Aspects will now be described with reference to the drawings summarized below. These drawings and the associated description are provided to illustrate example aspects of the disclosure, and not to limit the scope of the invention.

FIGS. 4A-4H illustrate example user interfaces.

DETAILED DESCRIPTION

An aspect of the present disclosure relates to systems and methods configured to provide graphical user interfaces optimized to enable content to be created and transmitted to a remote system (e.g., a cloud-based storage and content acquisition and distribution system). Such graphical user interfaces may optionally be optimized for portable computer devices with relatively small touch displays. The graphical user interfaces may be presented via a feedback application downloaded to the user device or via a webpage accessed and presented by a user device browser.

The graphical user interfaces may be configured to enable a user to provide feedback regarding an item (e.g., a review regarding a product or service, such as a restaurant, retail establishment, repair establishment, home services establishment, a recreational area, a movie, a concert, and/or the like) substantially in real time after interacting with such item. Such feedback may act as corrective feedback enabling such item to be improved in response to such feedback. After such feedback is provided via the graphical user interfaces, the feedback and/or a link thereto may optionally be transmitted in substantially real time to a remote system, such as a cloud based system. The cloud based system may optionally transmit some or all of the received feedback to one or more destinations (e.g., other user devices, entities that are the subject of feedback, third party content providers (e.g., advertisers), and/or the like).

Graphical user interfaces, such as those discussed elsewhere herein, may be provided via which a recipient of the feedback may view the feedback content (e.g., like/dislike indicator, still image content, video content, ratings, tags, and/or the like). The user interface may be presented via a feedback application downloaded to the user device or via a webpage accessed and presented by a user device browser. In addition, a communication interface may be provided via which the recipient may respond to and communicate with the user that submitted the feedback content in real time. Such communication may be performed via text message, audio, and/or video communications. Optionally, other viewers of the feedback may be enabled to communicate with the user that provided the feedback (e.g., via text, voice, and/or video communications). Optionally, other viewers of the feedback may be enabled to rate the user feedback as being helpful or unhelpful, wherein such indication may be stored in association with the feedback. An aggregation of helpful and unhelpful for a given item of feedback may be determined and presented in association with the feedback via viewer devices.

Figure 1A:
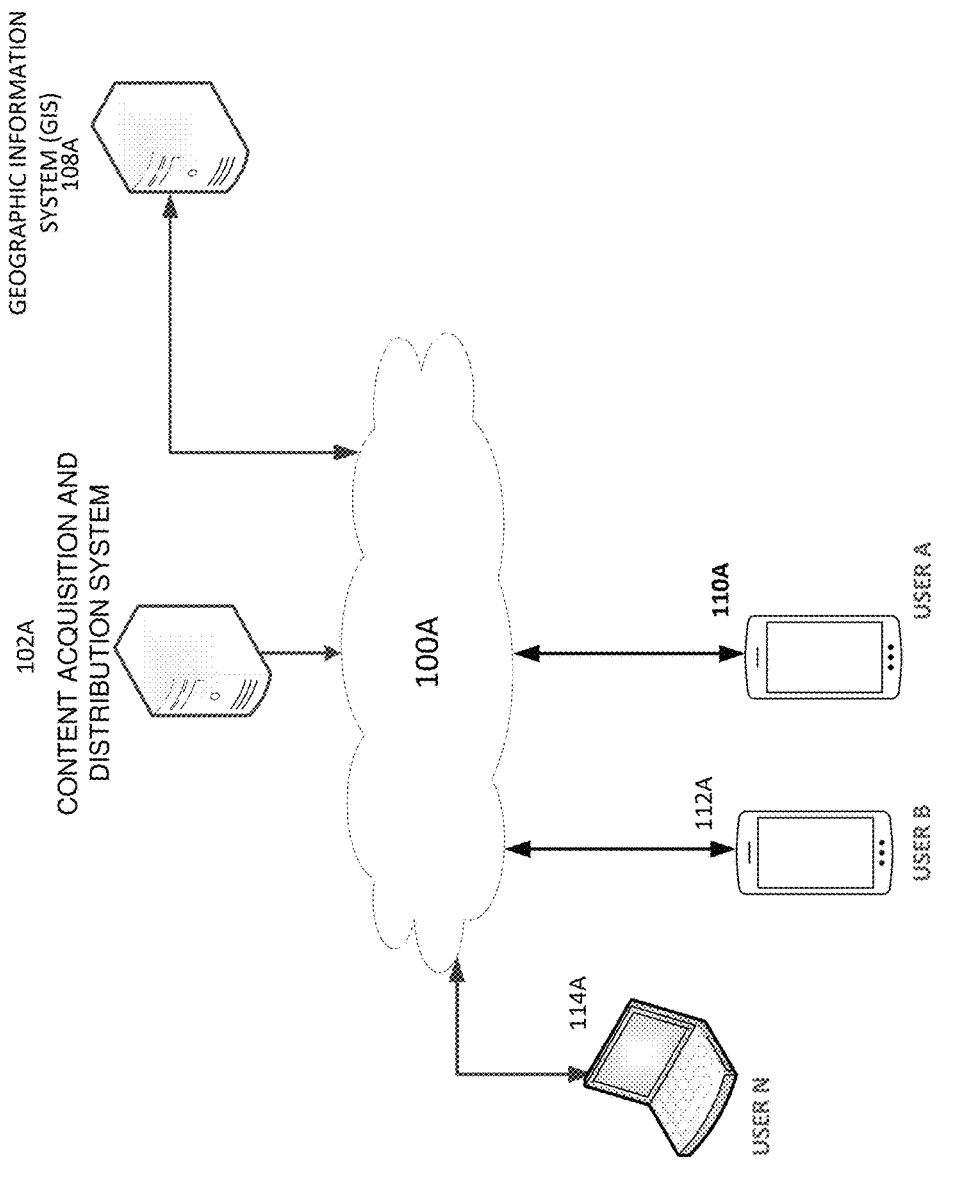
FIG. 1A illustrates an example networked environment architecture.
Figure 1B:
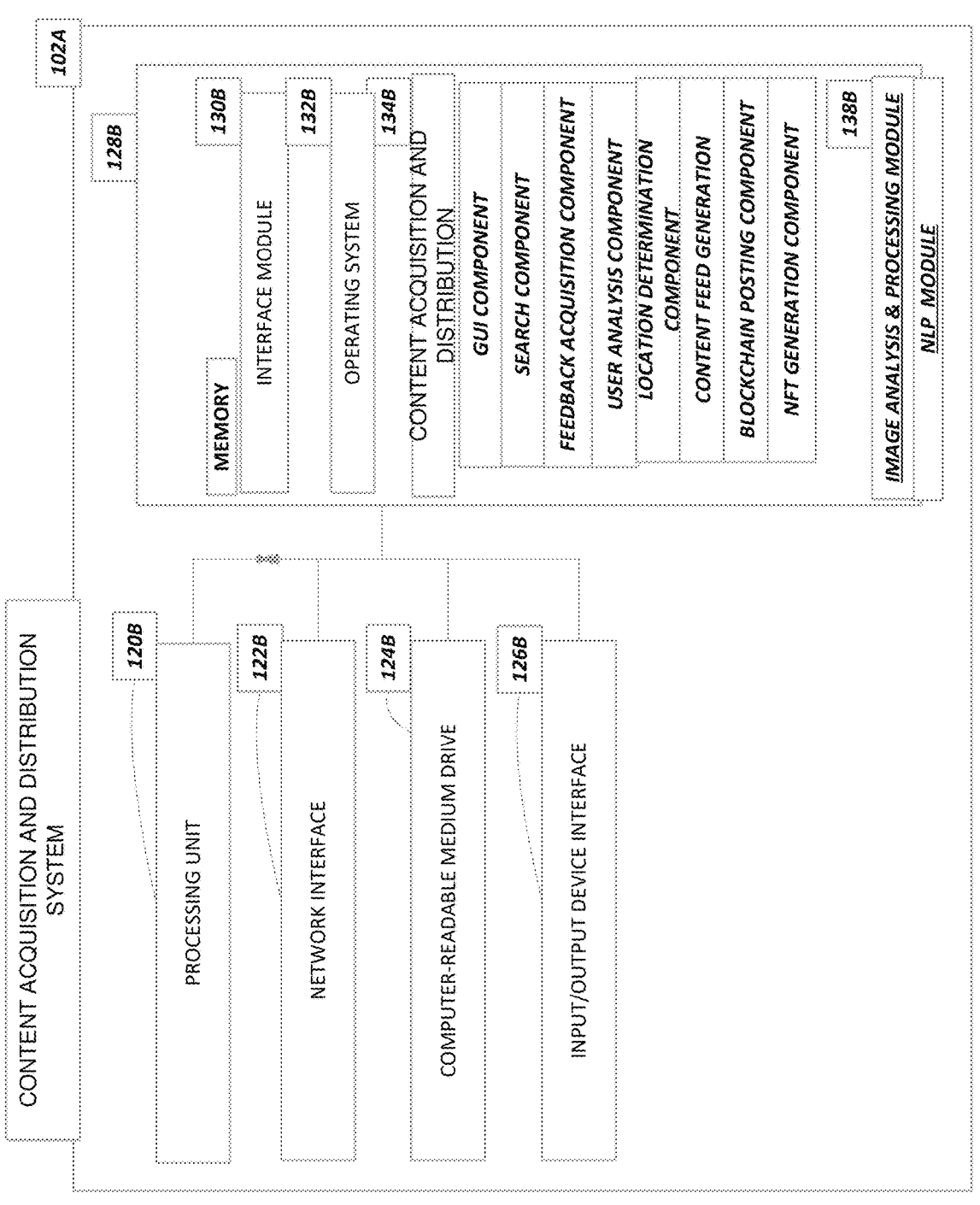
FIG. 1B illustrates an example system architecture.
Figure 2:
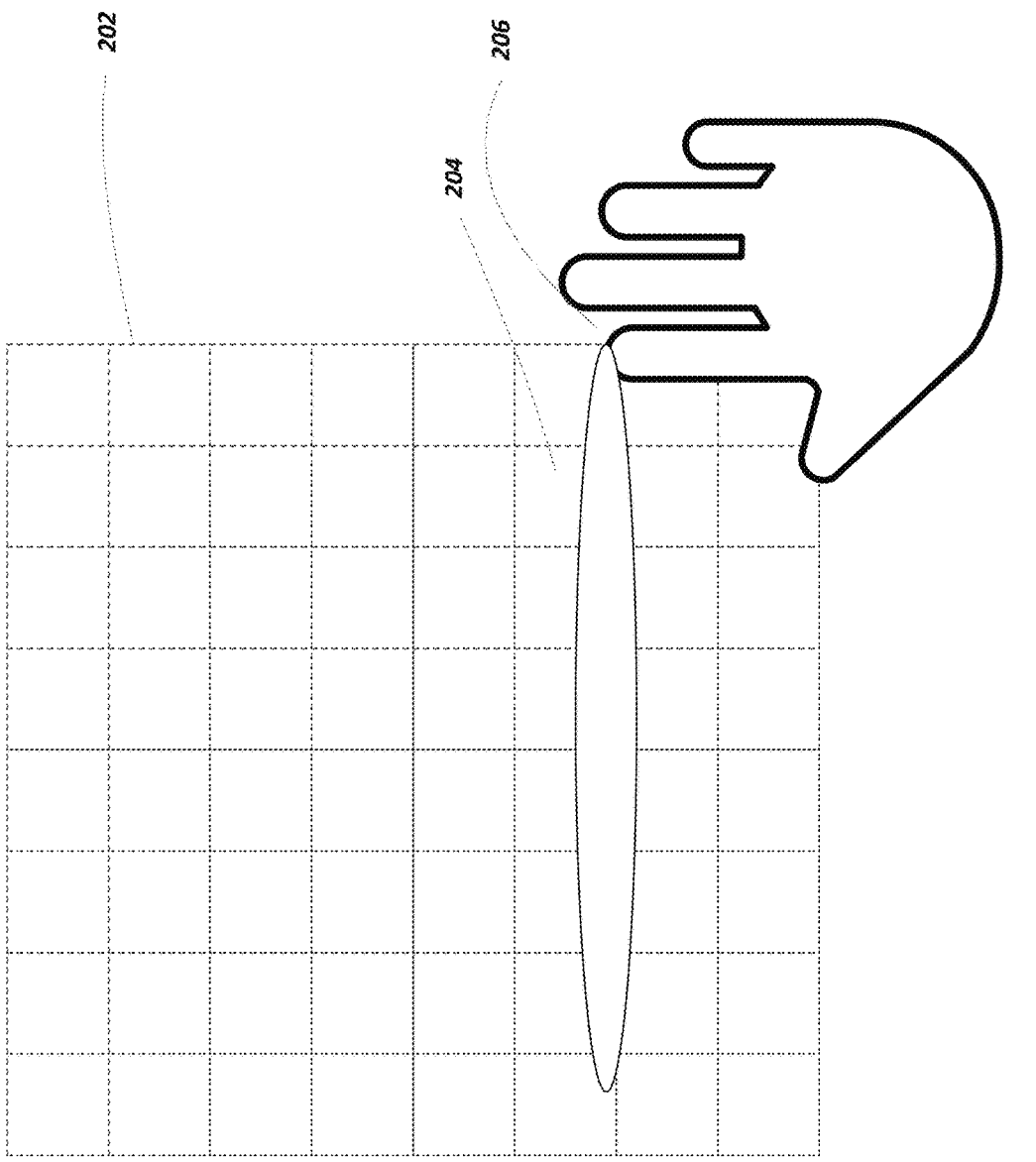
FIG. 2 illustrates an example process.

Feedback content and/or communications between a given content submitter and content recipient may be published so that the content may be available to large numbers of other users via corresponding graphical user interfaces (e.g., user interfaces provided via the feedback application, such as that illustrated in FIGS. 4D1, 4D2, or via a web browser). A provider of feedback content may also be a recipient of feedback content.

Optionally, a user may be prompted to provide feedback based at least in part on the user's geographic location. For example, location information may be provided via a mobile device (e.g., a smartphone) to the content acquisition and distribution system, an example of which is described elsewhere herein with respect to the figures. The system may utilize a map database provided by geographic information systems (GIS) to obtain detailed information about the locations of entities (stores, restaurants, movies) in a given area. Such maps may comprise Point of Interest (POI) data, including details about business names, types (e.g., restaurant, clothing store, movie theater), and their geographical boundaries (e.g., the coordinates of a building or store perimeter). Using the GPS coordinates, a determination may be made as to whether the user's location falls within a predefined geofence around an entity. Different entities may have their own geofence defined by their respective perimeter. For example, a restaurant might have a geofence with a radius of 15 meters from its center point (latitude, longitude). A reverse geocoding service may be accessed to convert the GPS coordinates into a human-readable address, which can then be matched to a given entity.

If a user is determined to be at a certain entity (e.g., a restaurant or store), the content acquisition and distribution system may cause the user's mobile device to prompt the user to confirm that the user is at the determined entity via a corresponding user interface. In response to the user indicating that the user is at the identified entity, the application may present a user interface prompting the user to provide feedback while the user is at the entity. A corresponding feedback/review interface, such as described elsewhere herein, may be presented by the user mobile device via which the user may provide feedback (e.g., a finger gesture, still images, video images, audio, text, and/or the like).

Optionally, a touch-enabled feedback interface presented to a user (e.g., presented via an application downloaded and installed on the user device) may instruct the user to swipe (e.g., using a finger on a touch sensitive screen or via other type of pointing device) in first direction (e.g., left) to provide a positive review and in a second (e.g., opposite) direction (e.g., right) to provide a negative review. Thus, the user is presented with a binary feedback input mechanism (positive or negative). The user's input (positive feedback or negative feedback) may be received by the system and stored in association with an identification of the reviewed item (where the identification may be provided before or after the user provides the swipe input). Thus, advantageously, if the application is open, a single gesture may be utilized to provide feedback, thereby facilitating real time user feedback and eliminating the need to navigate amongst many menus and the need to scroll through interfaces. Prior to or after providing the swipe feedback, the application may provide a user interface which includes fields via which the user may enter a name and/or description of the entity or item being reviewed, tags, and/or other data. Such data may be stored in association with the user feedback. Optionally, the name of the entity may be automatically populated based on geolocation data accessed as described elsewhere herein or the user may manually enter the entity name.

Optionally, after the user has provided the positive or negative feedback (e.g., via a swipe gesture), a user interface may be provided via which the user can provide more detailed feedback (e.g., via text, video, and/or audio input). Optionally, a control may be provided via which the user can indicate that the user does not want to provide more detailed feedback, in which case, the detailed feedback user interface may cease to be displayed.

The user feedback may be stored in association with an identification of the item or entity, and the feedback may be shared with other users via a networked communication (e.g., in a content feed, in response to a search query, via email, via a messaging service, and/or otherwise). Optionally, when the feedback comprises video content, length rules may be established that the feedback video needs to conform to. For example, the rules may specify that the video may need to be no shorter than a first specified length (e.g., 30 seconds or other length) and/or no longer than a second specified length (e.g., 5 minutes or other length). If a user submits an item of video feedback, a determination may be made as to whether the video feedback satisfies the length rules. If the video feedback satisfies the length rules, it may be shared as described elsewhere herein (assuming any other posting requirements are met). If the video feedback fails to satisfy the length rule, such sharing may be inhibited and the user may be correspondingly notified.

Optionally, depending on whether the user swiped to provide positive feedback or negative feedback, and/or depending on the item or entity being reviewed, different user interfaces may be provided for display to the user. For example, if the user swiped to give positive feedback regarding a restaurant, a user interface may be presented optimized to give more detailed positive feedback (e.g., what did you like about the restaurant ambience, what dishes would you recommend, would you go back?, etc.). Similarly, a set of positive feedback tags that are relevant to the entity/item being reviewed (e.g., for a restaurant "great food," "great ambience", "great service," "convenient parking," and/or the like) may be presented via which the user may select. Such selection may then be stored and presented to other users in association with the feedback.

If, on the other hand, the user swiped to give negative feedback, a user interface may be presented optimized to give more detailed negative feedback (e.g., what didn't you like about the restaurant ambience, what dishes were you disappointed in, was the service poor, etc.). Similarly, a set of negative feedback tags that are relevant to the entity/item being reviewed (e.g., for a restaurant "terrible food," "loud," "crowded," "poor service," "no parking," and/or the like)

may be presented via which the user may select. Such selection may then be stored and presented to other users.

Optionally, the tags disclosed herein may be utilized by a search engine in identifying content in response to a search query. Further, such tags may be utilized by search engines in selecting content for a content feed provided to a user.

Optionally, the user does not need to have a registered account to provide such feedback. If the user does not have a registered account, once the user has submitted the review, the user may optionally be prompted to establish an account (e.g., by providing requested information, such as name, email address, phone number, physical address, demographic data, preferences, and/or the like). If the user elects to establish an account, a corresponding user account record may be created, storing the user data from the user and/or other user data described herein. If the user does have a registered account, the user feedback may be stored in association with such user account.

Optionally, the feedback application hosted on the user device (or corresponding software accessed via a webpage) may enable the user to submit feedback anonymously. For example, the application may enable the user to submit feedback using an avatar and/or a fictitious name or with just a first name (which may be posted alongside the user's feedback when shared with other users) or no name at all. Optionally, a user specified unique blockchain identified avatar may be created that uniquely associates the user with the avatar to prevent or inhibit others from using that avatar. The avatar may optionally be user-created or may be selected from a library of avatars. Optionally, the user may be assigned a unique blockchain address.

In addition, if the feedback comprises a "selfie" of the user (e.g., in a still or video image captured using a front facing camera of a user device), wherein the face of the user appears in the image, the application may enable, via a user interface control, the user to instruct the application to obscure the user's face by blurring the user's face (e.g., by detecting the user's face using a learning model such as YOLO or Multi-Task Cascaded Convolutional Neural Networks, and applying a Gaussian blur to the face) or by placing a digital mask over the user's face. Optionally, the user interface may present a user with a selection of digital masks from which to choose. The application may then accordingly blur the user's face or place a user-selected mask over the user face prior to uploading the feedback for posting and may store an indication that such masks/blurring is to be used for future items of the user's feedback. The mask may optionally be user-created or may be selected from a library of masks.

Creating an avatar or mask with a moving mouth that syncs with spoken words of a user may include the following process. A user may select or create a digital character or avatar in a 2D or 3D design platform. Optionally, the user may design the avatar's (or mask's) facial features, including an articulated mouth that can be manipulated to display various phonemes (mouth shapes associated with different sounds). Once the avatar/mask is designed, the user may apply a rigging process, linking the avatar's mouth movements to a set of phoneme-based keyframes or "blend shapes" that match different sounds.

To enable the avatar to respond to speech in real time, the user may use a lip-syncing software tool that analyzes audio input (e.g., via a microphone on a user device) in real time and matches it to the pre-set mouth shapes which may then be rendered as the user speaks (e.g., in providing feedback/review, such as described herein).

Optionally, to encourage users to submit item/entity feedback, NFT (non-fungible token) feedback (e.g., video review) creation may be provided. For example, a digital representation of an item of feedback may be created and stored on a blockchain (e.g., a distributed ledger). The NFT may be stored as metadata on the blockchain. The metadata may be included in a JSON file that includes details about the NFT, such as the name of the item or entity being reviewed, a text description of the item or entity being reviewed, a link to a hosted video and/or still image feedback file, assigned tags, and/or any additional attributes or characteristics of the item or entity being reviewed (e.g., type of cuisine, opening hours). The feedback video or still images may be hosted by the NFT platform and/or on a decentralized storage system to which images or other media may be uploaded.

The user may mint the NFT. For example, the user can connect their crypto wallet to a selected NFT platform. The user may create a new item on the platform, upload the metadata or fill out fields of a user interface provided by the platform with the description, image link, and attributes. The user (or system operator) may need to pay a minting fee to officially publish the NFT on the blockchain. After minting, the NFT will have a unique identifier and be viewable on the blockchain via an explorer.

The NFT may be linked to the item/entity feedback, and whoever owns the NFT will have proof of ownership on the blockchain. The user may sell or transfer this NFT to others (e.g., an entity, such as a restaurant, being reviewed, other users, the system operator, and/or the like), enabling them to hold verifiable ownership of the feedback as digital content. Thus, by converting the feedback into an NFT, a verifiable, digital, and decentralized representation of the feedback is created that can be owned, traded, or showcased.

Optionally, to further enhance the availability of user feedback, a given item of feedback may be assigned its own locator (e.g., a Uniform Resource Locator (URL)). Optionally, the URL for the feedback may be assigned a unique second level domain. Optionally, a plurality of items of feedback may share a common top level domain, but have unique second level domains. The locator may comprise the name of the item or entity being reviewed, and/or the name of the user providing the feedback (which may be a pseudonym associated with the user). Optionally, some or all feedback may be associated with the same base URL to which text (e.g., an item, entity, or user name) may be appended. The names may be converted to a URL-friendly format as URLs should not contain spaces or special characters. Optionally, spaces may be replaced with hyphens (-), and special characters may be URL-encoded. Optionally, a unique identifier (such as a numeric ID or timestamp) may be added to a given feedback URL to ensure it is unique. A given feedback URL may be shared via a messaging service, an email, the feedback application, or otherwise. The URL may also be presented via a search engine when someone searches for the item, entity, and/or user name. Activation of the URL via a user device will cause the corresponding feedback to be transmitted to (e.g., streamed in the case of video feedback) to the user device for rendering.

Advantageously, assigning a unique URL to a specific item of feedback will enhance Search Engine Optimization (SEO). Unique URLs enable search engines to index each item of feedback individually. This means that a given feedback page gets crawled and stored in the search engine's database, making it easier for the content to be found by users searching for relevant queries. By contrast, if feedback does not have a unique URL or multiple items share the same URL, search engines may not index all the content properly or may fail to differentiate between the different items, leading to poorer visibility.

Further, search engines penalize websites for duplicate content. If multiple pieces of content (e.g., feedback) share the same URL or are accessible through multiple URLs without being properly canonicalized, search engines may see it as duplicate content, which can lower the SEO ranking of the corresponding feedback page.

Unique URLs can be optimized with keywords relevant to the content on the page. Including important keywords in the URL structure (such as /AcmeRestaurantReview/ instead of /restaurant98765/) provides search engines clues about the content and can help improve rankings for those terms.

Further, well-structured URLs with clear keywords also make it easier for users to understand the content of the page, which can improve click-through rates (CTR) from search results.

In addition, descriptive and unique URLs improve usability for visitors. When users see a URL that clearly describes what the page contains (e.g., /AcmeRestaurantReview/), they are more likely to click on it and engage with the content.

Backlinks (external links to content, such as feedback content posted on a webpage with an associated URL, from other sites) can greatly contribute to SEO. When each item of feedback content has a unique URL, it's easier for other websites or social media users to link directly to that specific page, increasing the number of backlinks and improving the page's authority and visibility and placement in search results.

When an item of feedback content has its own unique URL, users are enabled to easily share the URL (in the form of a link) across social media, blogs, and other platforms. This may lead to more traffic and engagement with the item of feedback content, both of which are positive signals to search engines that improve the ranking of the content. Social media platforms may also use a URL for an item of feedback content to generate previews (like images, titles, and descriptions), enhancing the likelihood of shares and clicks.

Additionally, when a given item has a unique canonical URL, search engines are enabled to determine which version of a page should be ranked and displayed in search results. This prevents confusion if multiple URLs point to similar content.

Unique URLs advantageously enable more precise tracking in analytics tools and enable the determination as to exactly which items of feedback content are driving web traffic, where that traffic is coming from, and how users are engaging with specific pages or review content.

Optionally, to prove the authenticity of feedback regarding an item/entity, such feedback (or a cryptographic representation of it) may be recorded on a blockchain. Such recordation creates an immutable, timestamped record on the blockchain that associates the item/entity with the corresponding feedback.

Optionally, a hash of the feedback (e.g., a digital representation of the feedback) may be performed and stored on the blockchain to reduce memory storage and network bandwidth utilization, rather than posting the full feedback. Such hashing of the feedback will generate a unique fingerprint (hash value) of the feedback content comprising a fixed-length output. Advantageously, even a small change in the feedback content will result in a drastically different hash, which guarantees the integrity of the original content.

Thus, the hash may be posted to the blockchain by sending a transaction with the hash as metadata.

Once the hash is posted on the blockchain, the authenticity of the feedback can be verified by recomputing the hash of the feedback using the same algorithm and comparing the recomputed hash with the hash stored on the blockchain. If the hashes match, the feedback is verified as authentic and untampered since the time of the blockchain record. If the hashes do not match, the feedback is determined to be inauthentic or tampered with since the time of the blockchain record Advantageously, once the hash is recorded on the blockchain, it cannot be changed, ensuring that the product description remains tamper-proof. Further, the blockchain ledger may be publicly accessible (for public blockchains like Ethereum or Bitcoin), enabling anyone to verify the authenticity. Even if the feedback is shared across multiple platforms, the blockchain record ensures its authenticity without needing a central authority.

Optionally, once the user has completed submitting feedback, the user may be prompted to provide feedback regarding an additional entity/item (e.g., as determined from previous geolocation information of the user).

Optionally, rather than or after providing feedback, a browse user interface may be presented via the feedback application. The browse user interface may enable the user to browse feedback items (e.g., ratings, reviews, and/or the like), select feedback categories to browse (e.g., restaurants, clothing stores, movie theaters, parks, and/or the like), browse social categories, and/or the like. Optionally, the feedback application enables the user to navigate to the browse interface from other user interfaces.

Enhanced techniques are provided for viewing feedback from multiple users. Optionally, a feed, such as a continuous, scrollable feed of feedback content, may be provided to a given user device and rendered by the user interface via a graphical user interface. Such a graphical user interface may be configured to enable a user to intuitively interact with such continuous feed, without necessitating navigation amongst large numbers of graphical user interfaces. For example, the feedback application may enable the user to scroll up and down or back and forth through the feed via a finger gesture (e.g., a swipe gesture). A share control may be provided via which the user can specify a share destination (e.g., a user name, an email address, a messaging service address, and/or the like) for one or more items of feedback selected by the user and an link to the selected items of feedback may be transmitted to the specified destinations. The recipients of the links may then activate the link, and the corresponding feedback may be transmitted (e.g., streamed) to the corresponding user devices for rendering.

By way of illustration, a continuous feed may be generated by a content acquisition and distribution system. The content acquisition and distribution system may customize a given continuous feed for a given user using an artificial intelligence learning engine. The customization may be based on one or more items of user-related data. For example, the user-related data may include profile data stored in a user profile record. The profile record may include data expressly provided by the user via corresponding profile user interfaces which may request that the user provide certain data. Such user-provided data may include interests (e.g., restaurants, vehicles, sports, entertainment, and/or the like), demographic information (e.g., age, gender, income, education level, location, and/or the like), and/or the like. User data may include search terms submitted by the user via a search interface. Such user data may also include content submitted by the user, such as feedback content. User data may include historical viewing patterns (e.g., feedback that the user has viewed), historical purchases, personality characteristics, and/or other user data described herein. The feedback content may include video content, tags, ratings, freeform text, and/or the like.

As will be described, video feedback may be analyzed using computer vision to identify objects (e.g., food, clothing, background images, and/or the like) in the video. Corresponding tags may be assigned to the video and may be utilized in generating a customized feed for the user. Natural language processing may be utilized in analyzing freeform textual feedback and generating a summary and/or selecting keywords corresponding to the freeform textual review. Such summary and/or keywords may be used to select content to provide in a user feed.

For example, computer vision may be utilized to detect and classify objects in images (e.g., a video) by applying a combination of image processing, machine learning, and deep learning techniques to respective frames of the video. Computer vision may be utilized to identify and track objects across frames, classify them into categories, and optionally understand their movement or interactions over time. For example, some or all of the following processes may be utilized to perform object detection and classification in images:

A video comprises a sequence of images (frames). The frames may be processed independently or in groups. A given frame may optionally be treated as a static image for detection, and detections across frames may be linked for object tracking and continuity. Object detection may be utilized to detect objects (e.g., clothing, dinner ware, tables, clothing racks, and/or the like) in an image and to classify them.

Deep learning-based object detection may be performed using a neural network-based architecture. For example, optionally Faster R-CNN (Region-Convolutional Neural Networks) may be utilized. Faster R-CNN may utilize a two-stage approach that first proposes regions in the image where objects might be, and then classifies and refines those regions. By way of further example, a YOLO (You Only Look Once) model may be utilized. YOLO employs a single-stage object detection model that processes the entire image in one pass, dividing the image into a grid and predicting bounding boxes and class probabilities for objects. Advantageously, YOLO is very fast, making it suitable for real-time video, although it may be less accurate than Faster R-CNN. Such neural network-based object detection engine may be implemented via an integrated circuit, such as an ASIC or custom chip;

In particular, to detect and classify objects, the deep learning models optionally use Convolutional Neural Networks (CNNs) to automatically extract features from the image. These features capture significant patterns such as edges, textures, and object parts that are utilized for recognizing different objects. The CNN transforms the raw pixels of a given video frame into a high-level representation that enables the model to distinguish between different object classes (e.g., a table, a person, a menu).

After detecting an object, the model outputs a bounding box (e.g., a rectangle) that surrounds the object in the image. The box may be defined by coordinates (x, y, width, height). The model may output a confidence score for each detection, representing the probability that the object belongs to a specific class (e.g., 95% chance that this object is a table). The model may classify the object based on the extracted features by assigning it to one of the predefined categories (e.g., person, table, plate, glass, clothing rack, etc.). An output of the learning model may optionally comprise a list of objects detected in the frame, along with their bounding boxes and class labels.

Object detectors may output multiple bounding boxes for the same object in a frame. To filter out these redundant boxes, Non-Maximum Suppression (NMS) may be utilized to remove bounding boxes that overlap significantly, keeping only the box with the highest confidence score.

For video images, it may be helpful to track objects across frames. This enables objects to be followed over time, which may be useful in determining what is occurring in the video. One or more techniques may be utilized to perform such object tracking. For example, Kalman filters may be utilized to apply statistics to predict the position of an object in the next frame based on its previous position and velocity.

Further, in video content, the temporal sequence of frames provides additional information that can improve detection and classification accuracy. For example, temporal smoothing or temporal filtering can help reduce noise in the detection by considering the object's position and movement over time.

A given neural network may comprise an input layer, convolutional layers followed by fully connected layers, ReLu layers and an output layer. Certain layers may be utilized to extract features from the input image to make predictions for object detection.

The input layer may resize an input image to a fixed size (e.g., 448×448 pixels or other size). The convolutional layers may apply convolutional filters to the input image to extract features. Early layers may be utilized to detect low-level features such as edges and textures, while deeper layers may be utilized to detect more complex features such as object parts and shapes.

A given convolutional layer may be followed by activation functions (e.g., a rectified linear activation function (ReLU) which is a piecewise linear function that will output the input directly if it is positive, otherwise, it will output zero) and max-pooling layers to reduce the spatial dimensions and focus on important features.

Recurrent Neural Networks (RNNs) or LSTMs (Long Short-Term Memory networks) may be employed, where such models use temporal data to improve the continuity and coherence of object detection over time.

A learning model may be utilized to recognize actions or behaviors (e.g., a person walking, running, or sitting). Such a learning model may analyze the objects detected and their motion across frames. Action recognition may combine object detection with temporal analysis (e.g., optical flow or recurrent networks) to model how objects move and interact over time.

Optionally, once objects are detected and tracked, the results may be post-processed to produce output in a structured format to identify the detected objects, their classes, their positions over time, and/or their trajectories.

These outputs may optionally be used to identify certain behaviors (e.g., eating a meal).

Using user data, psycho-graphic profiling and segmentation may be performed with respect to personalities, lifestyles, interests, opinions, values, and/or emotions, which may then be included in the user data. This may be performed using natural language processing (NLP), machine learning, and/or sentiment analysis.

For certain NLP analysis, an audio track (e.g., an audio track of an item of video feedback) may be converted to a textual transcript. For example, the audio track may be preprocessed to reduce noise. The audio signal may be converted into sequences of feature vectors, such as Mel-frequency cepstral coefficients (MFCCs) or spectrograms. These features may be fed into a model, which processes the sequential data and outputs text at each time step.

Deep learning models, trained on large amounts of speech data, may be used to perform the speech-to-text process to thereby generate a transcript. Optionally, Recurrent Neural Networks (RNNs), such as Long Short-Term Memory (LSTM) networks or Gated Recurrent Units (GRUs) may be utilized to perform the speech-to-text process.

Free form textual feedback/reviews and text transcripts of user-created video audio tracks may be collected. The text may be preprocessed. For example, text cleaning may be performed to remove stop words, special characters, and irrelevant data. The text may be tokenized, wherein the text is broken down into words and/or phrases. Normalization may be performed (e.g., lowercasing; stemming to reduce words to their root or base form by removing prefixes, suffixes, and/or other derivational affixes; and/or lemmatization that reduces words to their base or dictionary form (lemma), while considering the word's meaning and grammatical context (such as tense, part of speech, etc.).

Sentiment and emotion analysis may then optionally be performed. For example, sentiment analysis may determine whether a user's review expresses positive, negative, or neutral feelings. Sentiment scores may be generated using the text to categorize users based on their attitude toward products or services. Optionally, deep learning models (e.g., BERT) may be utilized to perform sentiment analysis.

BERT (Bidirectional Encoder Representations from Transformers) is a deep learning model configured to understand the context of words in a sentence by looking at the entire sentence (both left and right contexts) rather than processing it one direction at a time. BERT utilizes the encoder portions of a Transformer architecture. BERT comprises multiple transformer encoder layers (e.g., 12 to 24 layers). A given encoder layer includes sublayers. The sublayers may include a Multi-head Self-Attention layer that enables the model to attend to different parts of the input text at once, considering both the left and right context. The sublayers may also include a feed-forward neural network comprising a fully connected neural network applied after the attention mechanism, which enhances learning more complex representations of the input.

The input to BERT may comprise a sequence of tokens, including WordPiece Embeddings, wherein words are split into smaller subword units (WordPiece tokens), especially for handling rare or unknown words. The tokens may also include positional embeddings that encode the position of respective tokens in the input sequence, enabling the model to understand the order of words. The tokens may also include segment embeddings that are used to distinguish between different parts of the input (e.g., for a pair of sentences in tasks like question answering or sentence-pair classification).

The BERT self-attention mechanism may comprise bidirectional attention that enable BERT to capture relationships between words in a sentence by considering both the words that come before and after a target word. The BERT self-attention mechanism may comprise multi-head attention which utilizes multiple attention "heads," each attending to different parts of the sentence, enabling an enhanced understanding of word relationships.

BERT may be pre-trained using unsupervised learning tasks that enable it to understand word context deeply. Masked Language Modeling (MLM) may be used to randomly mask certain tokens in the input and instruct the model to predict the masked words based on the surrounding context. This forces the model to learn bidirectional context (both the left and right context of the masked word). Next Sentence Prediction (NSP) may also be used to train BERT to understand the relationship between two sentences. In this task, given two sentences, the model predicts whether the second sentence follows the first sentence in the original text or if it's a random sentence. This enhances BERT's ability to perform well on tasks involving sentence pairs (e.g., question-answering or text classification).

An example operation of BERT is as follows. Optionally, the process is executed with a hardware implementation as similarly discussed elsewhere herein.

The input text is tokenized using the WordPiece tokenizer, which splits words into subwords. The input text is then converted into a sequence of tokens, with special tokens [CLS] (used to represent the entire sentence) and [September] (used to separate two sentences or mark the end of the input sequence). A given token is transformed into a vector by combining its token embedding, positional embedding, and segment embedding. This forms the input to the BERT model. A given token attends to other tokens in the input sequence using the self-attention mechanism, considering both the tokens before and after it. This bidirectional attention enables BERT to better understand the meaning of each word based on its entire context.

After multiple layers of attention and feed-forward neural networks, the final output is a sequence of contextualized word embeddings, where each embedding contains information about the word itself and its context in the sentence.

The output corresponding to the [CLS] token is used for classification tasks (e.g., sentiment analysis), while outputs corresponding to individual tokens are used for tasks such as named entity recognition or question answering.

After pre-training, BERT may be fine-tuned for specific downstream tasks, such as sentiment analysis, text classification, named entity recognition, and/or the like. Fine-tuning may optionally comprise training the model on task-specific data with minimal adjustments to the architecture. The entire model may optionally be fine-tuned on labeled data for the task at hand.

BERT may be used to classify emotions expressed in reviews (e.g., anger, joy, sadness, surprise). This enhances psychographic profiling by identifying emotional drivers behind consumer decisions.

A Latent Dirichlet Allocation (LDA) algorithm may be utilized to identify common themes or topics that frequently appear in user reviews. For example, users may focus on specific aspects of a product (e.g., price, quality, durability).

Users can be profiled by their interests. For example, users can be segmented based on which topics they frequently discuss in their reviews. For example, someone focusing on "price" might be more price-sensitive, while someone discussing "design" might be more aesthetically driven.

Personality insights may be obtained using natural language processing psycholinguistic models, which may then be used to recommend content to the user. For example, linguistic inquiry and word count (LIWC) may be utilized to analyze word usage patterns to infer personality traits. LIWC may be utilized to determine how often people use specific categories of words (e.g., personal pronouns, emotions, cognitive processes) to assess their underlying psychological states.

The natural language processing model may be configured to predict personality traits such as openness, conscientiousness, extraversion, agreeableness, and/or neuroticism by analyzing the language used in item feedback/reviews. Reviews may reveal users' values and beliefs. For example, users who emphasize sustainability or ethical practices in their reviews might prioritize environmental or social values. The natural language processing model may be configured to detect patterns related to lifestyle preferences (e.g., fitness, luxury, family-oriented, and/or the like) by analyzing the context in which users describe their item experiences.

Optionally, behavioral segmentation may be performed. For example, behavioral triggers may be detected based on an analysis of feedback/reviews. Such analysis may reflect behaviors such as impulsiveness (e.g., "I passed by the restaurant and just had to stop in") or cautious decision-making (e.g., "I read many reviews, and they all indicated it was worth trying . . . "). These insights can be used to profile consumers based on their decision-making processes and/or to recommend content (e.g., reviews) and/or select third party content (e.g., advertisements) to present to the user.

Users may also be classified as being already engaged and loyal. For example, some users may frequently submit reviews, and the language they use might evolve over time. Regular reviews by a user might signal engagement and loyalty (and such users may be classified as such), while certain language patterns may indicate evolving interests or dissatisfaction (and such users may be classified as such).

After extracting psychographic features, optionally clustering algorithms (e.g., K-means, DBSCAN, and/or the like) may be utilized to group users into segments based on similar characteristics (such as consumption characteristics and other characteristics described herein), such as one or more of the following examples:

Value Seekers: Those who focus on price and practicality.

Experience Seekers: Those who emphasize aesthetics, innovation, or the emotional connection to a product.

Convenience seekers; Those who emphasize ease of item evaluation and acquisition.

Loyalists: Users who often mention brand loyalty or personal connection to a brand.

Ethical Consumers: Those who express concern about ethical practices or sustainability.

Optionally, some or all user data may be provided to third party content providers (e.g., advertiser systems) who may select users and may select the content to provide such selected users using such user data. By way of example, the third party content may include advertisements.

Some or all of the foregoing user data and/or other data may be provided to a collaborative filtering model (which is configured to recommend content by finding patterns between users based on their preferences or behaviors), a content-based filtering model (e.g., which is configured to recommend content based on the features of the content itself and how well it matches the user's profile (e.g., their past behavior, demographics, content they've generated, and/or other user data), a deep learning model (e.g., RNN, LSTM, and/or the like), and/or a hybrid model (e.g., that combines collaborative filtering and content-based filtering to leverage the strengths of both approaches).

Optionally, feedback content from one user may be recommended to another user based on determined similarities of the users (e.g., using collaborative filtering). For example, the characteristics of one user may be compared to characteristics of another user and if a threshold similarity is present, the users may be paired with respect to sharing content between the users. In determining the similarities between users, different characteristics may be weighted differently. The characteristics may include some or all of the user characteristics described herein (e.g., demographics, interests, types of items reviewed, types of content viewed, segments, personality traits, behavioral triggers, and/or the like). Such pairing of users may be performed using an artificial intelligence learning engine as described herein. A given user in the pair may be identified to the other user in the pair. Optionally, a given user needs to opt in to the pairing by activating a corresponding "accept" control. A given user in the pair may be notified of and/or presented with new feedback generated by the other user in the pair. A user interface may be provided via which the user can browse such social connections created via the system, wherein the user can view who the user has paired with and may be enabled to communicate (e.g., via text, audio, or video) with a given paired user.

Optionally, artificial intelligence engines, such as learning models described herein, may be utilized to generate a customized feed as well as other functions described herein (e.g., to determine user characteristics, to perform sentiment analysis, to perform object detection, etc.). Optionally, a given artificial intelligence engine may be implemented using one or more integrated circuits, such as application specific integrated circuits (ASICs), comprising gates, memory elements, buses, and/or the like. In particular, a learning engine ASIC may comprise hardware structures configured to accelerate the computation of neural networks and other machine learning models. The ASIC may be optimized for tasks such as matrix multiplications, data movement, and memory access. The ASIC may comprise one or more Processing Elements (PEs), which are configured to perform operations such as matrix multiplications, convolutions, or activation functions. The PEs may be organized in a grid or array format, enabling the PEs to work in parallel. This parallelism is advantageous for handling large matrix multiplications in neural networks. The PEs may comprise Matrix Multiplication Units (MMUs) configured to perform multiply-accumulate (MAC) operations efficiently. The PEs may comprise tensor cores configured to accelerate tensor computations used in neural networks. The ASIC may comprise convolution engines configured to compute convolutions in parallel, improving the performance of CNN models, such as those described herein. The convolution engines may be configured to perform depthwise separable convolutions and/or dilated convolutions.

The ASIC may comprise high-bandwidth memory configured to provide fast data access for the processing elements. The ASIC may include on-chip Static Random-Access Memory (SRAM) for storing weights, activations, and intermediate results of computations, reducing the dependency on external memory, which can be slower.

The content acquisition and distribution system may store some or all of the data described herein. For example, the system may comprise a database configured to store some or all of the following:

user profiles (which may include some or all of the following for a given user)

feedback regarding items/entities (e.g., control activations (e.g., swipes of a display), video, still images, text, audio, graphic symbols, and/or the like)

behavioral segmentation and/or triggers psycho-graphic profiling and segmentation personalities lifestyles interests opinions values emotions user engagement choices (e.g., reviews viewed, review replies, social media connections/responses, advertisements viewed, advertisements acted on (e.g., click throughs, purchases, etc.), and/or the like)

The user's profile may optionally be continuously enhanced and made more accurate with each item of feedback provided by the user, with search queries provided by the user, with user engagement choices, and/or in response to other user actions and content disclosed herein. Thus, the generated user profile will be an accurate representation of the user.

Certain aspects will now be described with reference to the figures.

FIG. 1A illustrates an example networked environment that may be utilized to practice certain example processes herein. A content acquisition and distribution system 102A may communicate via a network 100A (e.g., the Internet, an intranet, a cellular network, a wireless network and/or other network) with one or more GISs 108A. The content acquisition and distribution system 102A may perform functions described herein. For example, the content acquisition and distribution system 102A may prompt users to provide feedback regarding items/entities, receive feedback from user devices, share feedback with other users and entities, genre customized feeds, and/or enable entities and/or users to communicate in real time e.g., via text, audio, or video) with providers of feedback. Optionally, the system 102A may be configured to receive and distribute feedback from users whether or not there is an associated user account record.

In addition, the content acquisition and distribution system 102A may be configured to analyze video and/or still image feedback to identify items in such feedback and to assign corresponding descriptive tags to the feedback. Optionally, the tags disclosed herein may be utilized by a search engine in identifying content in response to a search query. Further, such tags may be utilized by search engines in selecting content for a content feed provided to a user.

The content acquisition and distribution system 102A may comprise or access a search engine. The content acquisition and distribution system 102A may receive search queries for feedback from users via the feedback application or a webpage and may compare search terms in the search queries with the tags (e.g., descriptive tags that indicate the subject matter of the feedback) assigned to feedback to identify matching feedback. Such matching feedback may be transmitted back to the user device from which the search query was received. For example, a user may enter the name of a restaurant, other entity, or product, and corresponding feedback from users may be provided in the form of search results to the device of the user that submitted the search query. The search process is similarly described elsewhere herein.

By way of example, tags associated with feedback (e.g., video content) may be utilized by an artificial intelligence (AI) engine to generate a customized content feed for a user. For example, the tags may describe the subject matter of the content (e.g., a product, place, or service being reviewed), and may provide what amounts to a summary of what the video is about. By matching the tags of videos the user has watched or liked, the AI can infer the user's interests.

The AI system may group feedback videos into categories based on tags, and then compares these tags to the user's engagement patterns. For example, if a user frequently watches videos with the tags "restaurant," "movie," and "airline," the AI will increase the weight for recommending videos with similar tags. Over time, the AI engine may assign weights to different tags based on how much the user engages with certain topics. This enables the AI to rank content that is more relevant to the user higher in their feed. As similarly discussed elsewhere herein, collaborative filtering or content-based filtering may be utilized to select feed content to provide/recommend to the user.

Thus, by leveraging the metadata associated with video tags, the AI engine can create a highly personalized, evolving video content feed that aligns with the user's preferences, behaviors, and context.

Optionally, the search results for a given entity or item may provide an indication as to the percentage of feedback received that is positive (and optionally the number of positive reviews) and the percentage of feedback that is negative (and optionally the number of negative reviews) as determined by the system. Optionally, a given item of feedback for an entity/item may be displayed on a given user device in association with the indication as to the percentage of feedback received that is positive (and optionally the number of positive reviews) and/or the percentage of feedback that is negative (and optionally the number of negative reviews).

The content acquisition and distribution system 102A may be configured to determine, store, and/or utilize user data, examples of which are described herein. Such user data may be provided expressly by a user (e.g., via a profile form that asks the user to provide various types of data such as discussed herein), may be determined from user-provided feedback (e.g., by analyzing such data using computer vision and natural language processing, from user searches (which may indicate user interests), and/or from a user's interaction with content from others (e.g., views of feedback from other users, views and interactions with advertisements, and/or the like)).

User data may comprise psycho-graphic profiling and segmentation data generated by the content acquisition and distribution system 102A based on feedback from a user, user profile data, and/or user interactions with content, as described elsewhere herein. Personality, sentiment, and/or emotions may be determined as described herein.

Some or all of the user data for some or all of the users may be provided to third parties, such as advertisers. Based on the user data, such third parties may identify users that are suitable for certain third party content and may transmit such content for display on the devices of such users. For example, demographic and psychographic data may both be used to create highly specific audience segments. This combination enables third parties to deliver more precise and relevant content by focusing both on who the user is (with respect to demographic data) and on their underlying motivations and desires.

Advertisers may be provided with AI-enabled bespoke micro-segmented advertising campaigns based on advertiser's detailed business, product profile, and/or goals. Such advertisements may be displayed in association with one or more items of user feedback. For example, an AI system may analyze detailed advertiser profiles, product information, and/or business goals to generate highly targeted campaigns. This may be achieved using natural language processing to identify in user reviews themes, sentiment, and/or specific keywords. This process makes the ad relevant to a viewer of feedback and may leverage the authenticity of user-generated content to build trust. By creating dynamic, tailored content at and placing it strategically based on real-time customer feedback, ad effectiveness, user engagement, and/or conversion rates for advertisers may be enhanced.

Optionally, to enhance the ability to authenticate user feedback regarding an item/entity, such feedback (or a cryptographic representation thereof) may be recorded on a blockchain as described elsewhere herein, and a corresponding coin may be electronically minted. The coin may optionally be provided to the user in order to incentive users to provide such feedback. Users viewing feedback may optionally also be provided with minted blockchain coins to incentivize them to view such user feedback.

Optionally, the content acquisition and distribution system 102A may be configured to generate a unique locator (e.g., URL) for a given item of feedback as described elsewhere herein. Such unique item/entity feedback locators may enhance search engine optimization as described elsewhere herein. For example, such a unique item/entity feedback locator enables that feedback to be featured at or near the top of search results in organic searches for the subject matter being reviewed. Optionally, an AI enabled process may be utilized to create a unique domain and page content for the user feedback that optimizes its relevance in searches. For example, an AI-powered domain generator may utilize machine learning and Natural Language Processing (NLP) to analyze the user feedback to identify the name of a business establishment being reviewed, feedback themes, praise or criticisms of the establishment and/or products provided by the establishment, and/or keywords, which may then be used to identify relevant, feedback-aligned, available domain name. Optionally, a generative AI model may be utilized to create dynamic page content to be displayed with the user feedback that summarizes the feedback, adds images of the establishment, provides the address, operating hours, and phone number of the establishment, and/or addresses the identified critics.

The content acquisition and distribution system 102A may be configured to detect illegitimate users, such as automated programs/robots, and prevent such illegitimate users from creating accounts, accessing accounts, submitting feedback/reviews, accessing certain user interfaces, and/or the like User devices 110A, 112A, 114A may be in networked communication with the content acquisition and distribution system 102A. A given user device may optionally have a feedback application downloaded to (e.g., from an application store or via a ticketing website), and executed by the user device. The application may be used to detect user gestures (e.g., swipe gestures) with respect to a user device sensor (e.g., a touch display or camera). The application may also include interfaces configured to receive still image and/or video inputs captured via a user device camera or otherwise (e.g., feedback video files or links thereto), text inputs, graphic inputs, and/or the like. The application may also enable real time communications (e.g., text, video, and/or voice) with other users. The application may also render content feeds received from the content acquisition and distribution system 102A, such as content feeds described elsewhere herein.

FIG. 1B is a block diagram illustrating example components of the content acquisition and distribution system 102A. The example content acquisition and distribution system 102A includes an arrangement of computer hardware and software components that may be used to implement aspects of the present disclosure. Those skilled in the art will appreciate that the example components may include more (or fewer) components than those depicted in FIG. 1B. The content acquisition and distribution system 102A may comprise a cloud-based computer system. Optionally, computer hardware and/or software components illustrated in FIG. 1B may be instead or also be included in a user device.

With respect to the cloud-based computer system implementation, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The content acquisition and distribution system 102A may include one or more processing units 120B (e.g., one or more general purpose processors, processors optimized for convolutional neural network calculations, such as the ASICs described herein, and/or high speed graphics processors), one or more network interfaces 122B, a non-transitory computer-readable medium drive 124B, and an input/output device interface 126B, all of which may communicate with one another by way of one or more communication buses. The network interface 124B may provide services described herein with connectivity to one or more networks or computing systems (e.g., geographic information systems, user devices, third party content providers, etc.). The processing unit 120B may thus receive information (e.g., user feedback, user profile information, user location information, other user data, names of entities where a user is located, other data disclosed herein, and/or the like) and/or instructions from other computing devices, systems, or services via a network, and may provide responsive data and/or execute instructions. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. An interface module 130B may provide access to data in the memory 120B and may enable data to be stored in the memory 120B. The memory 120B may store an operating system 132B that provides computer program instructions for use by the processing unit 120B in the general administration and operation of a content acquisition and distribution module 134B, including its components (GUI, search, feedback acquisition, user analysis, location determination, content feed, and blockchain posting components), as well as the image analysis and processing module and NLP module 138B.

The memory 128B may store user account records, including a user name, a user email address, a user phone number/SMS/text messaging address, geographical information (e.g., physical address, zip code, city, etc.) one or more unique or non-unique user identifiers, user profile data (e.g., demographic data, preferences, interests, psychographic data, other user data described herein, and/or the like), feedback content, other data described herein, and/or the like.

Some or all of the data and content discussed herein may optionally be stored in a relational database, an SQL database, a NOSQL database, or other database type.

The content acquisition and distribution module 134B may include a GUI component that generates graphical user interfaces and processes user inputs. The module 134B may include a search component which may include or access a search engine used to search for item/entity feedback. The search engine may identify feedback content whose associated metadata (e.g., tags) sufficiently matches the search terms (which may be in the form of the name of an entity or product, or a type of entity (e.g., Italian restaurant) or product (e.g., bathing suits)). The identified feedback content may be ranked based on the closeness of the match of the search query terms to the metadata. The identified feedback content may be transmitted to the user device from which the query was received, for display in ranked order. If the user selects an item of feedback content in the search results (e.g., clicks on a thumbnail of an item of feedback content), the selected item of feedback content may be accessed from memory and downloaded or streamed to the user device for playback (in the case where the feedback content comprises video content).

A feedback acquisition component is configured to receive feedback content (e.g., reviews) from user devices as similarly described elsewhere herein. Such feedback may be in the form of activation of a control (e.g., a finger gesture sensed by a touch sensitive display, such as a left swipe or right swipe), video content, still image content, audio content, a rating, and/or text content. The feedback acquisition component may also determine, utilizing location services provided by the location determination component, a current location of a user device, determine an entity that the user is at (e.g., a store, restaurant, movie theater, park, etc.), ask the user to confirm the entity, and cause a prompt to be presented on the user device requesting that the user provide feedback regarding the entity.

An image analysis and processing module 138B may be configured to perform image analysis (e.g., objection detection, movement detection, and/or the like) on image content, such as video or still image feedback content. The image analysis and processing module 138B may comprise one or more neural networks, such as those described herein, configured to perform such analysis (e.g., Faster R-CNN, YOLO, or the like).

The content feed component may be configured to generate feeds of content (e.g., feedback content) customized for a given user as similarly described elsewhere herein.

The blockchain posting component may be utilized to post feedback and/or hashes thereof to a blockchain to enable the authenticity of feedback to be determined as similarly described elsewhere herein.

The NFT generation component may enable an NFT to be minted corresponding to an item of feedback as similarly described elsewhere herein. By converting the feedback content into an NFT, a verifiable, digital, and decentralized representation of the feedback is created that can be owned, traded, or showcased.

FIG. 2 illustrates an example display sensor configured to detect gestures, such as finger swipes. As discussed elsewhere herein, user feedback regarding an item or entity may be provided by swiping across the user device touch-sensitive display while a user interface is displayed thereon. For example, the user interface may prompt the user to swipe in a first direction (e.g., right to left) to provide positive feedback regarding an item or entity, and to swipe in a second direction (e.g., left to right) to provide negative feedback.

The user device (e.g., a smartphone) may be configured to detect swipe motions using, for example, capacitive touch-screens and algorithms for gesture recognition. The capacitive touchscreen may comprise a grid of electrodes 202 underneath a glass screen. These electrodes create an electrical field. When a finger 206 (which conducts electricity) touches the screen, it disturbs the local electrical field at the point of contact. The system detects this disruption and calculates the precise location of the touch. Advantageously, capacitive touchscreens support multi-touch, enabling the user device to detect more than one touchpoint at the same time.

When a finger 206 makes a swipe gesture 204, the finger moves 206 across the screen, disturbing the electrical field at multiple points in a continuous manner. The user device continuously tracks the changing touch points as the finger moves. This data is recorded in memory as a series of coordinates over time.

Once the motion data is captured, a gesture recognition algorithm is utilized to analyze the movement. The algorithm looks for specific patterns such as direction (left, right, up, down), speed, and distance of the swipe.

Based on the movement pattern, the algorithm classifies the action as a swipe and determines its direction and purpose (e.g., providing a like or dislike indication).

After the swipe motion is detected, a corresponding message may be transmitted by the feedback application to the content acquisition and distribution system indicating whether the user provided positive or negative feedback.

Figure 3:
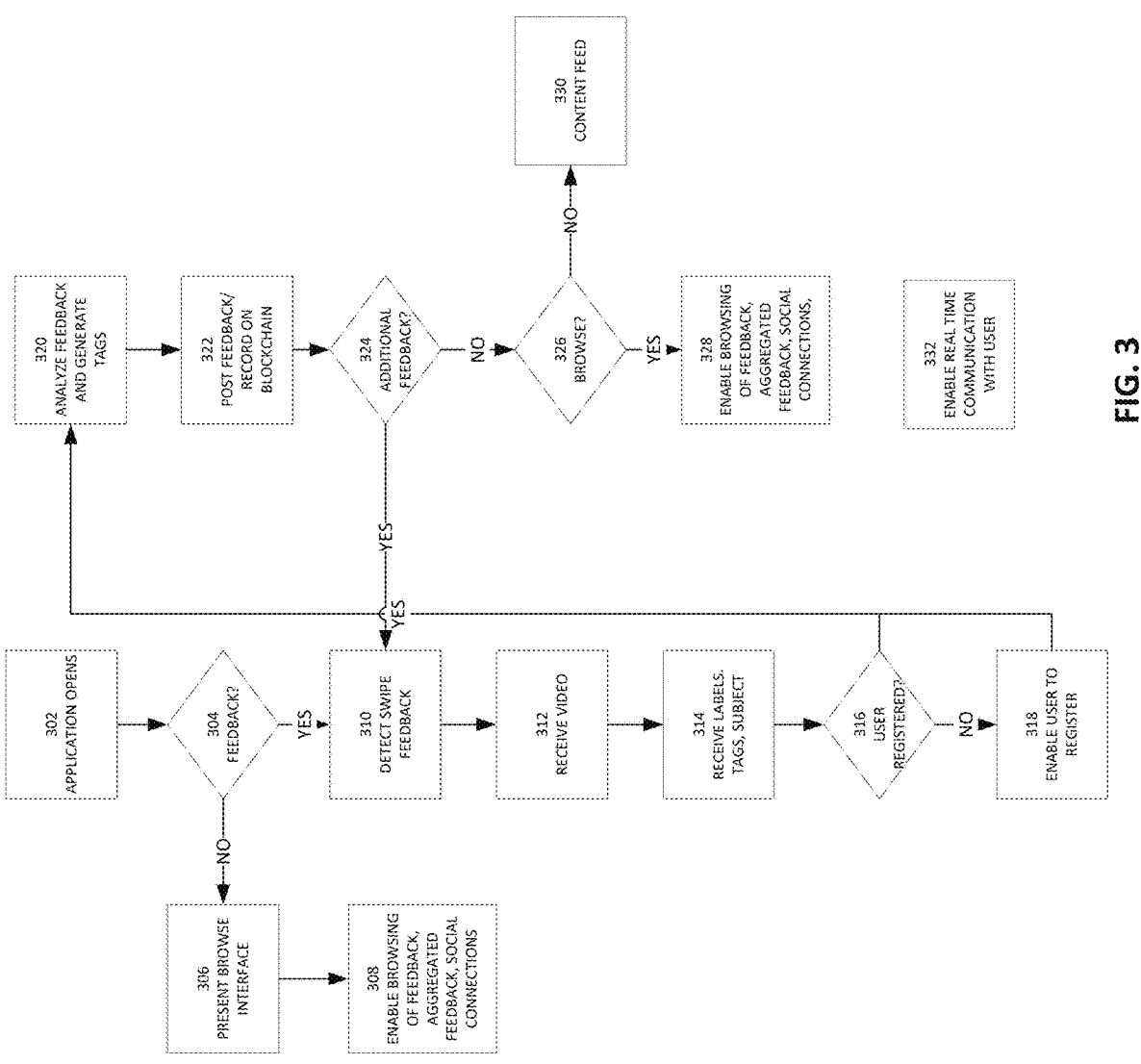
FIG. 3 illustrates an example user interaction with a touch display.

Referring now to FIG. 3, an example process is illustrated configured to enable feedback to be received, analyzed, and shared.

At block 302, a feedback application, such as described herein, is opened on a user device. At block 304, a determination may optionally be made as to whether the user is going to provide feedback regarding an item or entity. For example, the determination may be made based on the user selecting a feedback control. If the user takes no action or selects a browse control, at block 306 a browse interface may be presented by the feedback application. The browse interface is configured to enable the user, at block 308, to browse feedback of users (e.g., video feedback, still image feedback, text feedback, aggregated feedback (e.g., the percentage of users that provided positive reviews for a given item/entity, the number of users that provided positive reviews for the given item/entity, the percentage of users that provided negative reviews for the given item/entity, the number of users that provided negative reviews for the given item/entity, point ratings, star ratings, and/or the like), social connections (e.g., connections initiated by the system as described elsewhere herein), and/or the like.

Figure 4A:
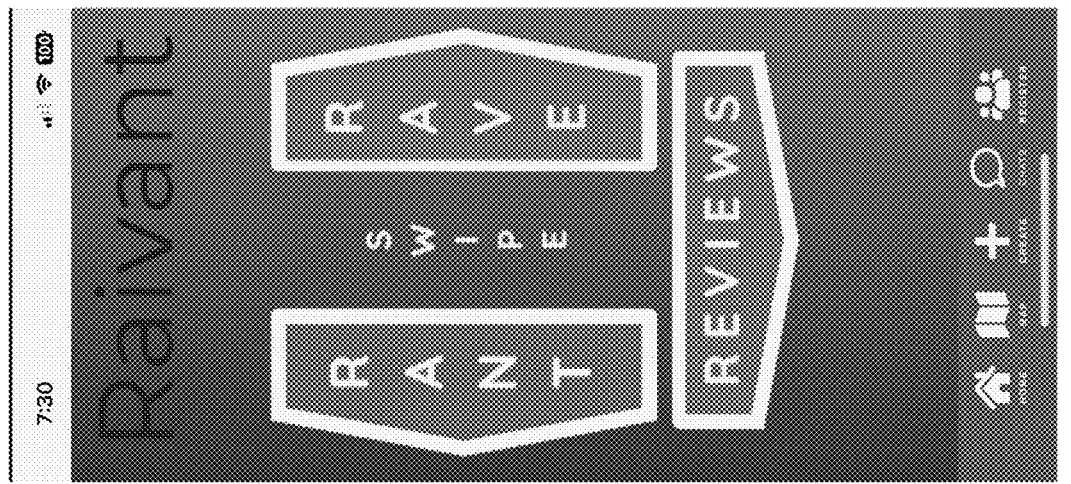

If the user indicates (e.g., by activating a corresponding control) that the user wants to provide feedback, at block 310 a swipe user interface, such as that illustrated in FIG. 4A, may be presented by the feedback application. Optionally, the swipe user interface may be presented immediately upon opening the application, and block 304 may be skipped. As similarly described elsewhere herein, the swipe user interface may instruct the user to swipe (e.g., using a finger on a touch sensitive screen or via other type of pointing device) in first direction (e.g., left or up) to provide a positive review (e.g., a rave) and in a second (e.g., opposite) direction (e.g., right or down) to provide a negative review (e.g., a rant). Thus, the user is presented with a binary feedback input mechanism (positive or negative). The user's input may be received by the system and stored in association with an identification of the reviewed item (where the identification may be provided before or after the user provides the swipe input). Thus, if the application is open, a single gesture may be utilized to provide feedback, thereby facilitating real time user feedback and eliminating the need to navigate amongst many menus and the need to scroll through interfaces.

Figure 4B:
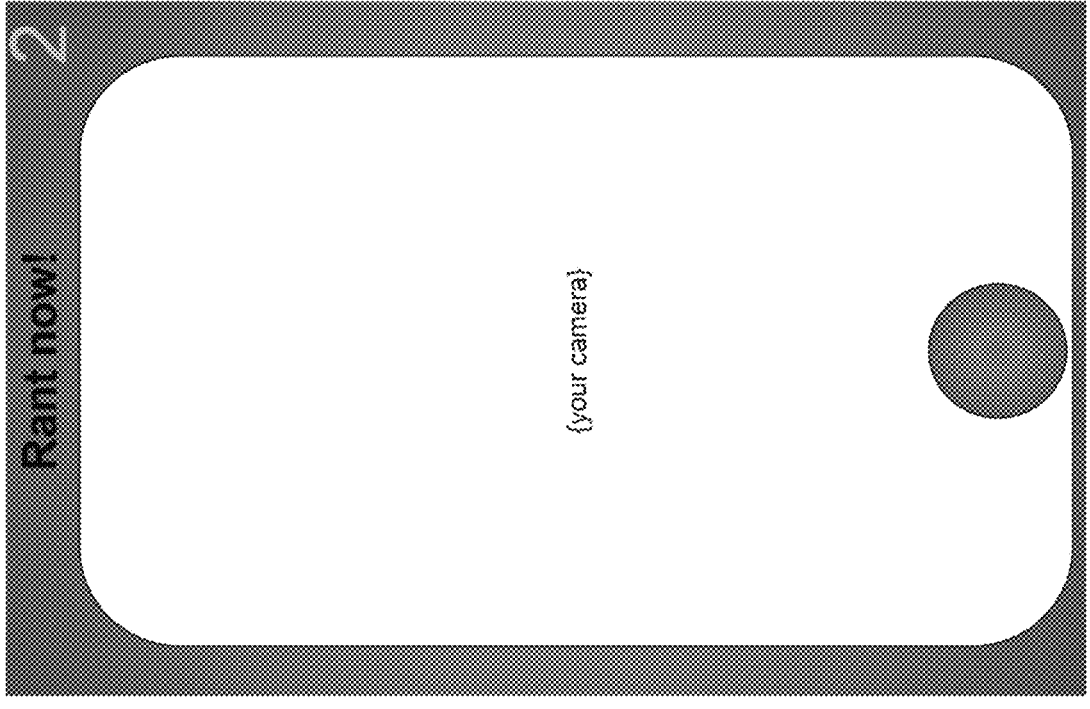
Figure 4C:
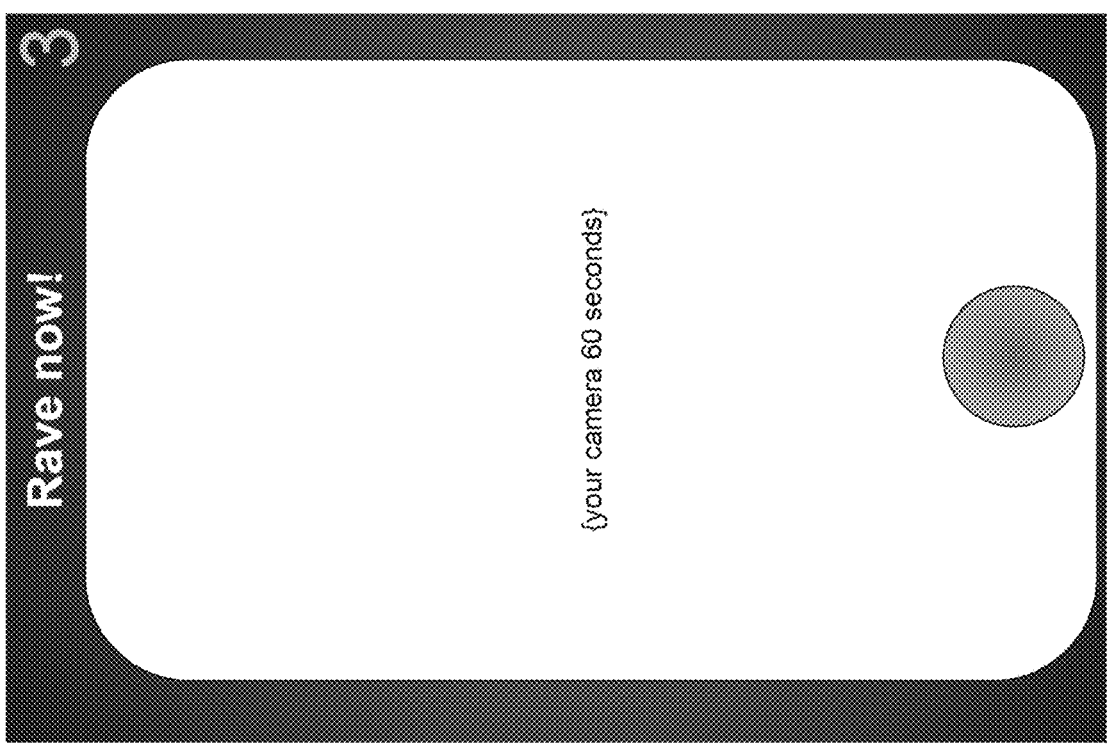

At block 312, a user interface is displayed on the user device prompting the user to provide more detailed feedback (e.g., video, text, graphics, emojis, etc.). In this example, the user provides video feedback. The video feedback may be in the form of a selfie (e.g., captured with a front facing camera of the user device) and/or of an item/entity being reviewed (e.g., captured with a rear facing camera of the user device). For example, the user interface illustrated in FIG. 4B may be automatically presented on the user device in response to the user swiping to providing a negative review (e.g., a rant) via the user interface illustrated in FIG. 4A, which textually indicates that the user will be providing a negative review (a rant). The user interface illustrated in FIG. 4C may be automatically presented on the user device in response to the user swiping to providing a positive review (e.g., a rave) via the user interface illustrated in FIG. 4A, which textually indicates that the user will be providing a positive review (a rave). In both FIGS. 4A and 4B, a view captured via the user device camera may be presented via a viewfinder user interface in association with a record control. In response to the user activating the record control, a video may be captured (e.g., of the user speaking, of a meal being reviewed, and/or the like).

At block 314, tags (e.g., selected from a menu of tags or entered free form), labels, and/or a textual subject description (e.g., the name of an item or entity being reviewed) may be received via a user interface presented on the user device and stored in association with the video and other feedback. Optionally, tags presented in a menu of tags may be selected based on whether the user has indicated (e.g., via a finger gesture input) that the feedback is positive or negative, and/or the subject for which feedback is being provided (e.g., restaurant, clothing store, movie theater, concert hall, automobile, furniture, etc.). Optionally, object recognition may be performed on images/videos provided by the content, and corresponding tags may be automatically selected and associated with the feedback. Optionally, a user textual review may be analyzed using a natural learning processing engine (such as described elsewhere herein), and corresponding tags may be generated and assigned to the feedback.

Figure 4E:
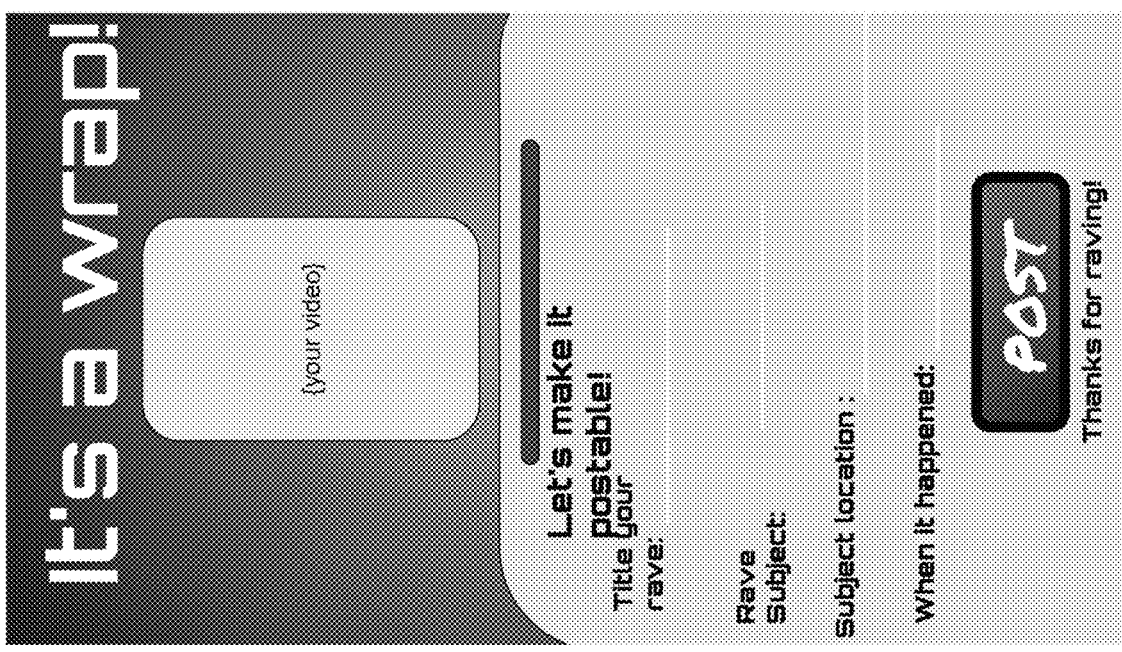
Figure 4F:
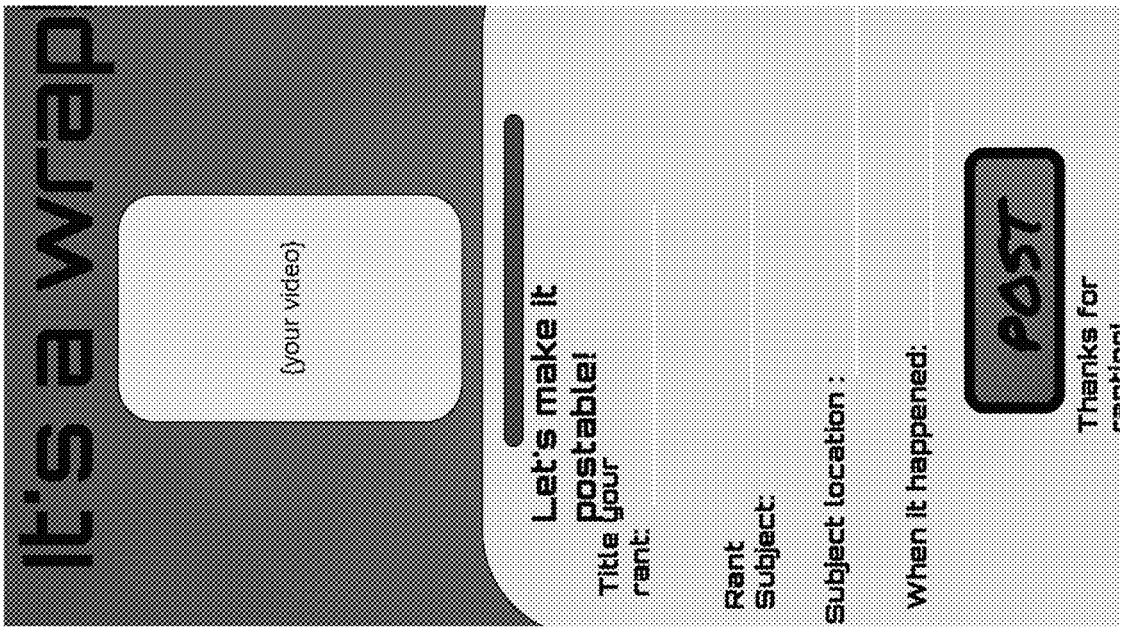

FIG. 4E illustrates an example user interface comprising fields via which the user can enter a title, a subject description (e.g., a description of the place, item or service being reviewed), a subject location (e.g., the address of a restaurant, store, or entertainment location being reviewed), and a time (e.g., the date and/or time the user ate a meal being reviewed, shopped at a given location, and/or the like) for a positive review (e.g., a rave). Optionally, the subject location information may be automatically populated based on a determined location of the user device as described elsewhere herein. A post control is provided which when activated causes the feedback (e.g., the review video) and/or all of the information received via FIG. 4E to be posted. FIG. 4F illustrates a similar user interface for a negative review (e.g., a rant).

At block 316, a determination may be made as to whether the user has a registered account with the content acquisition and distribution system for the services described herein. If it is determined that the user does not have a registered account, at block 318, a user interface may be provided via the user device that enables the user to create an account. For example, the user interface may include fields configured to receive some or all of the following: name, email address, phone number, physical address, demographic data (e.g., age, marital status, income, education level, location, and/or the like), preferences/interests (e.g., subject matter interests such as clothing, restaurants, entertainment, and/or the like), biometric data (e.g., eye retina prints, face prints, fingerprints, and/or the like), payment data (e.g., credit card number, bank data, debit card number, and/or the like), and/or the like. If the user elects to establish an account, a corresponding user account record may be created, storing the user data from the user and/or other user data described herein. Such data from the user account record may be utilized to provide customized feeds, recommend social connections, and/or the like.

Figure 4G:
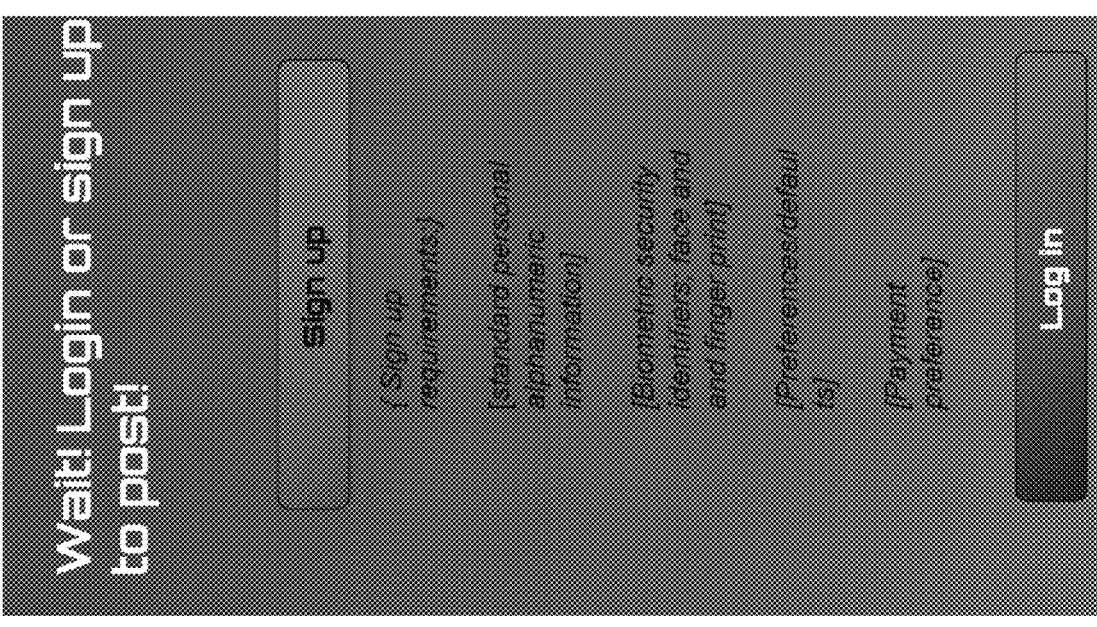

FIG. 4G illustrates an example user registration user interface via which a user with an existing account can log in to the account, or can create an account with fields configured to receive some or all of the user data discussed herein.

Figure 4H:
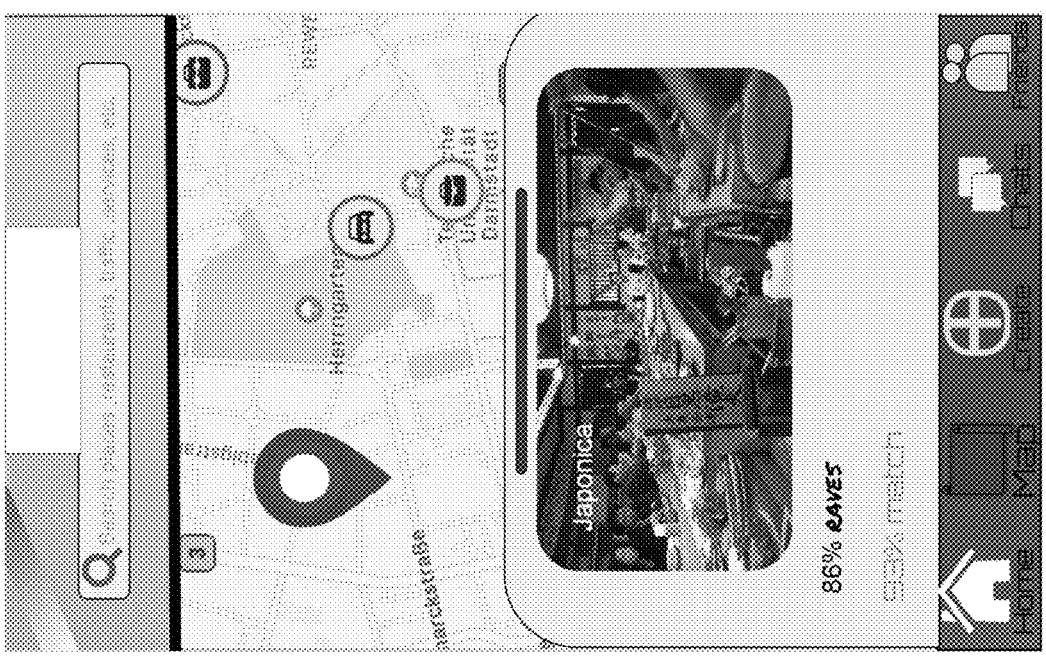

FIG. 4H illustrates an example map user interface. The map user interface may be presented on a user device in response to a user conducting (e.g., via the example search user interface illustrated in FIGS. 4D1, 4D2) a search (e.g., for a restaurant, retail establishment, entertainment venue, and/or the like), or may be pushed to the user device in the form of a recommendation or content feed, such as discussed elsewhere herein. The user interface may include an image of a venue or other location (e.g., a restaurant, retail establishment, entertainment venue, and/or the like). The image may be a still image or a video image. Optionally, the image may comprise a user-submitted video review of the venue. The name of the venue may be presented (e.g., overlaying the image). Optionally, the address of the venue may be displayed. Optionally, the percentage of feedback received for the location that was positive (e.g., "86% Raves") and/or that was negative (e.g., "24% Rants") may be calculated and presented. A match score may be calculated that indicates how close a match the location is to the user search query and/or to the user's profile.

The user interface illustrated in FIG. 4G further displays a map indicating the user's current location and the location of the venue. A control may be provided that when activated, causes a navigation route to be generated and displayed. The route may be displayed as a graphic overlaying the map and/or as textual turn-by-turn directions adjacent to the map.

A navigation interface may be provided (e.g., comprising icons/tabs) which when selected will cause a corresponding user interface to be presented (e.g., home, map, create, chats, friends, and/or the like).

Optionally, certain security techniques may be utilized to prevent an automated robot (an automated program), a hacker, and/or the like from creating an/or accessing an account.

For example, rate limiting and/or throttling may be utilized to restrict the number of requests an IP (Internet Protocol) address or user account can make within a given time period. If a robot attempts to rapidly create multiple accounts or access accounts in quick succession, rate limiting may be utilized to slow down or block further requests made over a network.

IP Address and geolocation filtering may be utilized wherein the IP addresses from which requests are analyzed, and suspicious network activity (e.g., suspicious account created, app access, and/or the like) may be blocked or flagged for further investigation. Suspicious activity may include some or all of the following:

Requests from known data centers or VPNs used by robots.

Large numbers of requests from a single IP address in a short period of time.

Requests coming from locations that don't match the user's historical behavior.

Device fingerprinting may be utilized to detect robots. Device fingerprinting may comprise collecting a variety of data points about the device used to access the app (e.g., browser type, operating system, screen resolution, time zone, installed plugins). By creating a unique fingerprint for a given device, robots that attempt to use fake or frequently changing configurations can be identified and their network communications blocked. For example, robots typically do not exhibit consistent device behaviors such as legitimate users, and such robotic behavior may be detected and blocked.

Behavioral analysis may be utilized to detect a robot, wherein user interactions are tracked. Robots tend to interact with applications in different ways than humans do. Behavioral analysis may be utilized to detect and block robots using some or all of the following patterns:

Speed of interaction, where robots can interact with forms and submit data much faster than a human, and so if interaction speed above a certain threshold is detected, a determination may be made that the "user" is a robot.

Mouse/cursor movement and clicks. Robots typically do not move the mouse or other pointing mechanism naturally or scroll through a page as a human user would. Thus, if non-human appearing mouse/cursor movement and/or scrolling are detected, a determination may be made that the "user" is a robot.

Typing speed: Human typing typically has irregular pauses, while robots often input data instantly, without irregular pauses. If such instant input of data without irregular pauses is detected, a determination may be made that the "user" is a robot.

Suspicious navigation patterns: A robot may jump directly to account creation or login pages without viewing other content. If such behavior is detected, a determination may be made that the "user" is a robot.

A honeypot may be used. A honeypot may comprise a hidden form field or link that normal users will not interact with but robots, which typically complete every field or click every link, may interact with. If a form is submitted with data in the honeypot field, a determination may be made that the "user" is a robot and can be blocked.

Multi-Factor Authentication (MFA) may be utilized, wherein users may be required to provide two or more verification factors to access an account, such as:

Something the user knows (password).

Something the user has (a mobile device for receiving a one-time passcode).

Something the user is (biometrics, like fingerprints).

Thus, even if a robot successfully creates an account, MFA adds an additional layer of security that prevents bots from logging in without access to the second factor (e.g., a phone).

JavaScript challenges may be utilized to detect robots. Many robots cannot execute JavaScript properly. By embedding JavaScript challenges within the app or website, robots can be detected based on their inability to run the code, while humans are unaffected. This method may include requiring users to solve a simple puzzle generated by JavaScript or determining whether the user's browser properly renders or interacts with JavaScript elements.

Once a user creates an account, the system can issue a cookie or token that identifies the device and verifies that it is trusted. If a robot tries to access the account from a different device or without the token, the system can challenge or block the access attempt.

Artificial Intelligence (AI) and/or machine learning algorithms may be utilized to detect patterns associated with robot behavior. AI and/or machine learning algorithms may be configured to analyze traffic patterns, request timings, and session data to identify robots.

The AI and/or machine learning algorithms may be configured to adapt over time by learning from new robot behaviors and identifying subtle signals that distinguish humans from automated systems.

A Web Application Firewall (WAF) may be utilized to inspect incoming traffic for known attack patterns or signs of robot activity (such as unusual request headers, or request payloads). WAFs can block malicious traffic before it reaches the app.

Two or more of the foregoing techniques may optionally be combined in a layered security approach. For example, using multifactor authentication for account creation and logins, while also employing rate limiting, behavioral analysis, and device fingerprinting may provide enhanced protection against robots, making it significantly harder for robots to bypass security mechanisms while minimizing friction for legitimate users.

At block 320, the feedback provided by the user may be analyzed and corresponding tags may be generated based on the analysis. For example, as described elsewhere herein, images may be analyzed using learning engines to identify objects and actions, video audio tracks may be converted to text and analyzed using NLP. From such analysis, a user's personalities, lifestyles, interests, opinions, values, and/or emotions, may be inferred and corresponding indications may be stored in memory.

At block 322, all or some of the feedback may be posted for public access (e.g., via an application and/or via a webpage) and/or stored on a blockchain. As similarly discussed elsewhere herein, optionally, a hash of the feedback may be performed and stored on the blockchain to reduce memory storage and network bandwidth utilization, rather than posting the full feedback. Once the hash is posted on the blockchain, the authenticity of the feedback can be verified by recomputing the hash of the feedback using the same algorithm and comparing the recomputed hash with the hash stored on the blockchain. If the hashes match, the feedback is verified as authentic and untampered since the time of the blockchain record. If the hashes do not match, the feedback is determined to be inauthentic or tampered with since the time of the blockchain record.

Optionally, NFT creation and minting may be provided as similarly described elsewhere herein. For example, a digital representation of an item of feedback may be created and stored on a blockchain (e.g., as metadata). The metadata may comprise details about the NFT, such as the name of the item or entity being reviewed, a text description of the item or entity being reviewed, a link to a hosted video and/or still image feedback file, and/or any additional attributes or characteristics of the item or entity being reviewed. The feedback video or still images may be hosted by the NFT platform and/or on a decentralized storage system to which images or other media may be uploaded. The user may sell or transfer this NFT to others (e.g., an entity, such as a restaurant, being reviewed, other users, the system operator, and/or the like), enabling them to hold verifiable ownership of the feedback as digital content.

At block 324, a user interface may be presented on the user device prompting the user to provide additional feedback regarding other entities and/or objects. For example, the user interface may prompt the user to swipe in a first direction (e.g. right) to provide additional feedback, and to swipe in an opposite direction (e.g., left) to received and view via the user device artificial intelligence-selected reviews that may be selected based on user data (such as some or all of the user data described herein) and optionally presented as a feed, advertising (which may be directed to the user based on user data), and/or social connections (e.g., other users that the user has been paired with based on user data).

If, at block 324, the user indicated that the user wants to provide more feedback, the process may proceed back to block 310. If the user indicates that the user wants to view the selected reviews, advertising (which may be directed to the user based on user data), and/or social connections, at block 326, the user may browse the reviews, and at block 328 the corresponding items may be transmitted to and presented by the user device. Optionally, aggregation of feedback may be accessed and transmitted to the user device (e.g., the percentage and/or number of users that gave positive feedback, the percentage and/or number of users that gave negative feedback, overall ratings, and/or the like). Optionally, the user interface may enable the user to browse through the presented content and data.

Optionally, if the user takes no action, at block 330, an artificial intelligence-generated customized feed may be presented to the user comprising feedback of other users and/or advertisements targeted to the user based on user data transmitted to advertisers.

FIGS. 4D1, 4D2 illustrates example user interfaces that may be presented if the user swipes left at block 324 or if the user takes no action with respect to the user interface illustrated at FIG. 4G. The user interface may present thumbnails and/or textual descriptions of a plurality of automatically selected item/service reviews of other users. A given thumbnail may be presented in association with a play control. In response to the user activation of the play control, the corresponding review may be played back, optionally in full screen mode. A search user interface may be provided comprising a search field configured to receive a search query (e.g., a textual search query). For example, a search query may relate to a person, a place, food, a product, traffic, and/or the like. In response to the user submitting a search query, a search engine may search for corresponding matching content which may be presented in a search result user interface. Optionally, the search results may be ranked according to relevancy, and some or all of the search results may be presented in ranked order.

For example, the search engine may provide the query to a database storing content (e.g., user reviews) and/or may search for information from websites. By way of example, the search engine may use automated crawler programs to continuously scan and explore the web. The crawler may visit websites, following links between pages to collect and update information. After crawling, the data from web pages may be organized in an index, which may be configured as a database. The index may be optimized to enable quick retrieval of relevant content when a user performs a search. The index may include information regarding the crawled webpages, such as keywords and phrases, meta descriptions, headings and subheadings, Images and multimedia, and/or link structure (how pages are linked to each other).

The search results may be ranked based at least in part on their relevance to the query. The ranking algorithm may evaluate pages and content based on a variety of factors including one or more of those factors disclosed herein. Example factors may include the relevance to the query (e.g., how closely the user's query matches the keywords or phrases associated with the content). Pages with content closely aligned to the search query may be ranked higher. The depth of the content, readability, and freshness (how recently it was updated) may optionally be used in ranking the search results. Pages with relatively more authoritative and relevant backlinks (e.g., links from other reputable websites) may be ranked relatively higher.

User engagement signals (indicating how users historically interacted with items in the search results), may be utilized in ranked. For example, the click-through rate (indicating how frequently users click on a particular search result when it's shown in search results) may be utilized in determining its ranking. Dwell time, indicating wow long users stay on a page/item of content after clicking through to on in search results may be utilized to determine the ranking of the page/item (where longer stay suggests the content is helpful). The bounce rate (where a given user immediately leaves the page/item after clicking through to it in search results) may be utilized in determining the ranking of the page/item (where a high bounce rate may indicate that the content is not useful).

The mobile-friendliness of a page/item (the degree to which it is optimized for mobile devices) may be used in determining the ranking of the page/content. The speed at which a page/item of content loads may be used in determining the ranking of the page/content (e.g., where faster-loading pages/content are ranked higher because users prefer quick access to content). Security may be used in determining the ranking of the page/content. For example, websites using HTTPS encryption may be ranked higher than non-secure HTTP websites, as they offer a more secure user experience.

The searcher's location and other personalization (e.g., past search behavior) may be used in determining the ranking of the page/content to personalize the search results. For example, if the user query is "which is the best sushi restaurant," the search engine may use the user's geographic location in ranking the search results (wherein pages/content for restaurants closer to the user are ranked higher than those more distant).

The search engine may then transmit the ranked results to the user device for display (e.g., in Search Engine Results Page (SERP)). Top-ranked results may be rendered at the top of the SERP. The search results may also include page/content snippets, local business listings, images, and/or videos.

Optionally, throughout the process, at block 332, communications may be received and transmitted, optionally in real time. For example, if the user posts a review of a restaurant, the restaurant may be informed of the review in substantially real time, and the review (or a link thereto) may be provided to the restaurant. The restaurant may view the review and provide an immediate response which may be transmitted to the user device in real time. For example, if the user provided a positive review, the restaurant may transmit a thank you message to the user in real time. If, on the other hand, the user provided a negative review, the restaurant may transmit a message comprising an apology and or inform the user that corrective action will be taken.

Thus systems and methods are disclosed for collecting, analyzing, and distributing content, such as feedback content. An analysis of the content performed using learning engines may be utilized in determining the distribution of feedback content. Techniques are disclosed for blocking network communications from automated programs.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, the method comprising:

in response to a first event, displaying on a user device a touch-enabled user interface configured to respond to finger swipes, wherein in response to a user finger swipe in a first direction a first user interface is displayed, the first user interface configured to receive positive feedback regarding an item, and in response to a user finger swipe in a second direction, the second direction opposite of the first direction, a second user interface is displayed, the second user interface configured to receive negative feedback regarding the item;

at least partly in response to detecting a swipe in the first direction, causing the first user interface to be presented comprising a video viewfinder displaying an image from a camera of the user device in association with a record control;

at least partly in response to detecting activation of the record control, recording video content using the camera of the user device;

transmitting the video content over a wireless network to a cloud storage system;

posting the video content and enabling a plurality of devices of other users to access the video content;

using a first learning engine to detect objects in the video content;

accessing profile information for the user;

providing an identification of one or more detected objects to a second learning engine;

providing user profile information to the second learning engine;

using the second learning engine to select a set of video content;

transmitting video content from the set of the video content to the user device;

recording the video content or a link thereto on a blockchain;

enabling an authenticity of the video content to be verified by recomputing a hash of the video content and comparing the recomputed hash with a hash of the video content stored on the blockchain;

enabling a transferable non-fungible token corresponding to the video content to be minted;

causing a search user interface to be displayed on the user device;

receiving a user search query;

identifying content based at least in part on the user's search query and a determined user location;

ranking the identified content;

transmitting at least a portion of the ranked content to the user device in ranked order;

enabling a map user interface to be displayed on the user device in response to a first event, the map comprising an image of a venue, a name of the venue, data on feedback from users regarding the venue, and a map indicating a location of the venue;

detecting that a second user attempting to create a user account is an automated robot; and at least partly in response to detecting that the second user attempting to create a user account is an automated robot, blocking a first network communication from the second user.

2. The method of claim 1, the method further comprising:

determining a descriptive term for the video content; and generating a unique uniform resource locator for the video content including a second level domain comprising the descriptive term.

3. The method of claim 1, the method further comprising:

using an artificial intelligence engine to identify similarities between the user and a third user;

based at least in part on the identified similarities, pairing the user with the third user; and at least partly in response to pairing the user with the third user, enabling the user and the third user to electronically communicate.

4. The method of claim 1, the method further comprising:

transmitting the video content and/or the link thereto to a first destination; and enabling the first destination to electronically communicate with the user in substantially real time.

5. The method of claim 1, the method further comprising:

providing a tag user interface via which the user is enabled to provide one or more tags;

receiving one or more tags from the user via the tag user interface via which the user is enabled to provide one or more tags;

storing the tags in association with the video content; and enabling a search engine to utilize the tags in performing a search.

6. The method of claim 1, wherein the first user interface comprises text that indicates that it is configured to receive positive feedback and the second user interface comprises text that indicates that it is configured to receive negative feedback.

7. The method of claim 1, the method further comprising updating the profile information of the user based at least in part on an analysis of the video content and/or tags associated therewith.

8. A system, the system comprising:

a first computing device;

a circuit comprising a plurality of core processors arranged in a grid and configured to perform operations in parallel; and non-transitory computer readable memory that stores instructions that when executed by the computing device cause the system to perform operations comprising:

in response to a first event, cause a touch-enabled user interface configured to respond to finger swipes to be displayed on a user device, wherein in response to a user finger swipe in a first direction a first user interface is displayed, the first user interface configured to receive positive feedback regarding an item, and in response to a user finger swipe in a second direction, the second direction opposite of the first direction, a second user interface is displayed, the second user interface configured to receive negative feedback regarding the item;

at least partly in response to detecting a swipe in the first direction, enable the first user interface to be presented comprising a video viewfinder displaying an image from a camera of the user device in association with a record control;

at least partly in response to detecting activation of the record control, recording video content using the camera of the user device;

use the circuit to identify objects in the video content and to associate tags with the video content;

use the tags to select content to provide to the user;

transmit the video content over a wireless network to a storage system;

post the video content and enable a plurality of devices of other users to access the video content;

access profile information for the user;

provide one or more of the tags to a learning engine;

provide user profile information to the learning engine;

use the learning engine to select a set of video content;

transmit video content from the set of the video content to the user device;

record the video content or a link thereto on a blockchain;

enable an authenticity of the video content to be verified by recomputing a hash of the video content and comparing the recomputed hash with a hash of the video content stored on the blockchain;

enable a transferable non-fungible token corresponding to the video content to be minted;

cause a search user interface to be displayed on the user device;

receive a user search query;

identify content based at least in part on the user's search query and a determined user location;

rank the identified content;

transmit at least a portion of the ranked content to the user device in ranked order; and enable a map user interface to be displayed on the user device in response to a first event, the map comprising an image of a venue, a name of the venue, data on feedback from users regarding the venue, and a map indicating a location of the venue.

9. The system of claim 8, the operations further comprising:

determine a descriptive term for the video content; and generate a unique uniform resource locator for the video content including a second level domain comprising the descriptive term.

10. The system of claim 8, the operations further comprising:

use an artificial intelligence engine to identify similarities between the user and a second user;

based at least in part on the identified similarities, associate the user with the second user; and at least partly in response to associating the user with the second user, enable the user and the second user electronically communicate.

11. The system of claim 8, the operations further comprising:

transmit the video content and/or the link thereto to a first destination; and enable the first destination to electronically communicate with the user in substantially real time.

12. The system of claim 8, the operations further comprising:

detect that a second user attempting to create a user account is an automated robot; and at least partly in response to detecting that the second user attempting to create a user account is an automated robot, block a first network communication from the second user.

13. The system of claim 8, the operations further comprising:

provide a tag user interface via which the user is enabled to provide one or more user specified tags;

receive one or more user specified tags from the user via the tag user interface via which the user is enabled to provide one or more user specified tags;

store the received user specified tags in association with the video content; and enable a search engine to utilize the user specified tags in performing a search.

14. The system of claim 8, wherein the first user interface comprises text that indicates that it is configured to receive positive feedback and the second user interface comprises text that indicates that it is configured to receive negative feedback.

15. The system of claim 8, the operations further comprising: update the profile information of the user based at least in part on an analysis of the video content and/or the tags associated therewith.

16. Non-transitory computer readable memory that stores instructions that when executed by a computing device cause the computing device to perform operations comprising:

in response to a first event, cause a touch-enabled user interface configured to respond to finger swipes to be displayed on a user device, wherein in response to a user finger swipe in a first direction a first user interface is displayed, the first user interface configured to receive positive feedback regarding an item, and in response to a user finger swipe in a second direction, the second direction opposite of the first direction, a second user interface is displayed, the second user interface configured to receive negative feedback regarding the item;

at least partly in response to detecting a swipe in the first direction, enable the first user interface to be presented comprising a video viewfinder displaying an image from a camera of the user device in association with a record control;

at least partly in response to detecting activation of the record control, recording video content using the camera of the user device;

identify objects in the video content and to associate tags with the video content;

use the tags to select content to provide to the user;

transmit the video content over a wireless network to a storage system; and post the video content and enable a plurality of devices of other users to access the video content;

access profile information for the user;

provide one or more of the tags to a learning engine;

provide user profile information to the learning engine;

use the learning engine to select a set of video content;

transmit video content from the set of the video content to the user device;

record the video content or a link thereto on a blockchain;

enable an authenticity of the video content to be verified by recomputing a hash of the video content and comparing the recomputed hash with a hash of the video content stored on the blockchain;

enable a transferable non-fungible token corresponding to the video content to be minted;

cause a search user interface to be displayed on the user device;

receive a user search query;

identify content based at least in part on the user's search query and a determined user location;

rank the identified content;

transmit at least a portion of the ranked content to the user device in ranked order; and enable a map user interface to be displayed on the user device in response to a first event, the map comprising an image of a venue, a name of the venue, data on feedback from users regarding the venue, and a map indicating a location of the venue.

17. The non-transitory computer readable memory of claim 16, the operations further comprising:

determine a descriptive term for the video content; and generate a unique uniform resource locator for the video content including a second level domain comprising the descriptive term.

18. The non-transitory computer readable memory of claim 16, the operations further comprising:

use an artificial intelligence engine to identify similarities between the user and a second user;

based at least in part on the identified similarities, associate the user with the second-user; and at least partly in response to associating the user with the second user, enable the user and the second user to electronically communicate.

19. The non-transitory computer readable memory of claim 16, the operations further comprising:

transmit the video content and/or the link thereto to a first destination; and enable the first destination to electronically communicate with the user in substantially real time.

20. The non-transitory computer readable memory of claim 16, the operations further comprising:

provide a tag user interface via which the user is enabled to provide one or more user specified tags;

receive one or more user specified tags from the user via the tag user interface via which the user is enabled to provide one or more user specified tags;

store the received user specified tags in association with the video content; and enable a search engine to utilize the user specified tags in performing a search.

* * * * *